US00RE46875E

(19) United States
(12) Reissued Patent
Fujita et al.

(10) Patent Number: US RE46,875 E
(45) Date of Reissued Patent: May 29, 2018

(54) SHEET PROCESSING APPARATUS

(71) Applicant: CANON KABUSHIKI KAISHA, Tokyo (JP)

(72) Inventors: Keiko Fujita, Kashiwa (JP); Daisaku Kamiya, Abiko (JP); Hideki Kushida, Moriya (JP); Yasuo Fukatsu, Abiko (JP); Takako Hanada, Tokyo (JP); Takayuki Fujii, Tokyo (JP); Toshiyuki Miyake, Abiko (JP); Kenichi Hayashi, Abiko (JP)

(73) Assignee: Canon Kabushiki Kaisha, Tokyo (JP)

(21) Appl. No.: 15/072,221

(22) Filed: Mar. 16, 2016

Related U.S. Patent Documents

Reissue of:
(64) Patent No.: 7,866,652
Issued: Jan. 11, 2011
Appl. No.: 12/506,050
Filed: Jul. 20, 2009

U.S. Applications:
(63) Continuation of application No. 11/530,792, filed on Sep. 11, 2006, now Pat. No. 7,581,725.

(30) Foreign Application Priority Data

Sep. 13, 2005 (JP) ..... 2005-266112

(51) Int. Cl.
*B65H 39/00* (2006.01)
*B42C 1/12* (2006.01)
(Continued)

(52) U.S. Cl.
CPC ..... *B42C 1/12* (2013.01); *B65H 9/101* (2013.01); *B65H 29/12* (2013.01); *B65H 31/34* (2013.01);
(Continued)

(58) Field of Classification Search
CPC ..... B42C 1/12; B65H 9/101; B65H 23/12; B65H 31/34; B65H 2301/3613;
(Continued)

(56) References Cited

U.S. PATENT DOCUMENTS 5,219,159 A 6/1993 Malachowski et al. ..... B65H 9/002 271/228
5,263,697 A * 11/1993 Yamazaki et al. ..... B27F 7/006 270/58.08

(Continued)

*Primary Examiner* — Joseph Kaufman
(74) *Attorney, Agent, or Firm* — Canon U.S.A., Inc. IP Division

(57) ABSTRACT

A sheet processing apparatus includes an aligning member and a shift conveying unit. The aligning member is movable in a width direction perpendicular to a sheet conveying direction and presses a sheet stack loaded on a sheet processing tray so as to align the sheet stack in the width direction. The unit is provided on the upstream side of the tray and conveys a sheet, shifting the sheet in the width direction. Being shifted by the unit, sheets are loaded at first and second loading positions on the tray. When sheets are loaded at the first loading position, the aligning member is moved to a first standby position corresponding to the first loading position in advance. When sheets are loaded at the second loading position, the aligning member is moved in advance to a second standby position corresponding to the second loading position.

12 Claims, 19 Drawing Sheets

(51) Int. Cl.
*B65H 9/10* (2006.01)
*B65H 29/12* (2006.01)
*B65H 31/34* (2006.01)

(52) U.S. Cl.
CPC ..... *B65H 2220/02* (2013.01); *B65H 2220/11* (2013.01); *B65H 2301/363* (2013.01); *B65H 2301/3613* (2013.01); *B65H 2301/3621* (2013.01); *B65H 2404/1424* (2013.01); *B65H 2511/20* (2013.01)

(58) Field of Classification Search
CPC ..... B65H 2301/3621; B65H 2511/20; B65H 2404/1424; B65H 2301/363; B65H 2220/02; B65H 2220/11
See application file for complete search history.

(56) References Cited

U.S. PATENT DOCUMENTS 6,059,285 A * 5/2000 Suga ..... B65H 9/002 271/228
6,102,385 A * 8/2000 Wakamatsu et al. .. B65H 31/34 270/58.07
6,783,124 B2 * 8/2004 Tamura et al. ..... B26D 7/2628 270/58.07
6,832,759 B2 * 12/2004 Nagasako et al. ..... B65H 31/10 271/220
7,389,980 B2 * 6/2008 Kushida ..... B65H 9/06 270/58.12
7,490,822 B2 * 2/2009 Kushida ..... 270/58.12
2001/0022425 A1 * 9/2001 Toyofuku ..... B65H 9/002 271/177
2002/0079642 A1 6/2002 Tamura et al.
2003/0052446 A1 3/2003 Endo et al. ..... B42C 1/12 271/287
2005/0230896 A1 * 10/2005 Funada ..... B65H 31/26 270/58.08
2006/0170149 A1 * 8/2006 Seto ..... B65H 9/04 271/240
2011/0018193 A1 * 1/2011 deJong ..... B65H 7/06 271/228

* cited by examiner

SHEET PROCESSING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a continuation of U.S. patent application Ser. No. 11/530,792, filed Sep. 11, 2006, which claims priority to Japanese Application No. 2005-266112 filed Sep. 13, 2005, all of which are hereby incorporated by reference herein in their entirety.

BACKGROUND OF THE INVENTION

1. Field of the Invention

The present invention relates to a sheet processing apparatus.

2. Description of the Related Art

Some image forming devices such as photocopiers, printers, facsimiles, and multifunctional peripheral devices are provided with a sheet processing apparatus that processes sheets discharged from the body of the image forming apparatus. For example, the sheet processing apparatus staples the sheets. Some of such sheet processing apparatuses load the discharged sheets on a process tray and align the sheets before stapling.

Japanese Patent Laid-Open No. 2004-51256 discloses an image forming apparatus whose body is provided with a lateral register correction unit that detects the side edge in a direction perpendicular to the sheet conveying direction (hereinafter referred to as "width direction") of a sheet and moves the sheet in the width direction so as to correct the position in the width direction of the sheet. The term "lateral register correction" here means position correction in the width direction of a sheet.

By providing such a lateral register correction unit, the lateral register position of a sheet can be aligned with the image forming position. In addition, since the side edge of the sheet can be detected and the sheet can be moved while the sheet is being conveyed, the sheet position can be corrected without reducing the productivity of the image forming apparatus.

In addition, by performing the lateral register correction of the sheet, the sheet can be discharged from the body of the image forming apparatus to the sheet processing apparatus with the position of the side edge in the width direction of the sheet aligned.

However, while the sheet is conveyed from the entrance of the sheet processing apparatus to, for example, a sheet stapling part in the sheet processing apparatus, lateral register displacement, that is to say, displacement in the width direction occurs. Therefore, when sheets are processed, a sheet alignment operation is performed on a process tray on which sheets are temporarily loaded. That is to say, it is necessary to perform a sheet alignment operation on the process tray even after the lateral register correction is performed in the body of the image forming apparatus.

Recently, high productivity has been required not only for image forming apparatus but also for a system including sheet processing apparatus. Therefore, it is necessary to reduce the time for sheet processing operations such as sheet alignment on the process tray.

In addition, when the sheet processing apparatus processes a plurality of copies, during a sheet alignment operation on the process tray, sheet stacks are offset copy by copy. The sheet stacks are thereby loaded on the discharge tray, being offset stack by stack. Thus, the sheet stacks are sorted. However, the larger the offset distance is, the longer time is required for the alignment operation on the process tray. Therefore, in order to achieve high productivity in the entire system, it is necessary to reduce the alignment time concerning sorting.

If there is a malfunction in the unit that aligns sheets, the entire system can go down. This is one of the factors that prevents high productivity from being achieved.

SUMMARY OF THE INVENTION

The present invention provides a sheet processing apparatus that can achieve high productivity.

In an aspect of the present invention, a sheet processing apparatus includes a shift conveying unit, a sheet processing tray, an aligning member, and a discharge member. The shift conveying unit conveys a sheet in a sheet conveying direction and shifts the sheet in a width direction perpendicular to the sheet conveying direction. After being conveyed by the shift conveying unit, sheets are loaded on the sheet processing tray. By being shifted in the width direction by the shift conveying unit, the sheets are loaded at a first loading position and a second loading position that is offset from the first loading position in the width direction on the sheet processing tray. The aligning member is movable in the width direction and presses the sheet stack loaded on the sheet processing tray so as to align the sheet stack in the width direction. The discharge member discharges the sheet stack aligned by the aligning member. When sheets are loaded at the first loading position, the aligning member is moved to a first standby position corresponding to the first loading position in advance and then moves from the first standby position in order to align the sheet stack loaded at the first loading position. When sheets are loaded at the second loading position, the aligning member is moved in advance to a second standby position corresponding to the second loading position and then moves from the second standby position in order to align the sheet stack loaded at the second loading position.

In another aspect of the present invention, a sheet processing apparatus that aligns sheets loaded on a sheet processing tray includes a pair of aligning members and a shift conveying unit. The pair of aligning members are movable in a width direction perpendicular to a sheet conveying direction and press both sides of the sheets loaded on the sheet processing tray so as to align the sheets in the width direction. The shift conveying unit is provided on the upstream side of the sheet processing tray in the sheet conveying direction, shifts a sheet to a predetermined position in the width direction, and conveys the sheet to the sheet processing tray. The distance in the width direction between the pair of aligning members at their standby positions when the shift conveying unit shifts a sheet in the width direction is smaller than the distance in the width direction between the pair of aligning members at their standby positions when the shift conveying unit does not shift a sheet.

In another aspect of the present invention, a sheet processing apparatus includes a sheet conveying path, a sheet processing tray, and an aligning member. After being conveyed through the sheet conveying path, sheets are loaded in a plurality of alternative discharge positions on the sheet processing tray. The aligning member presses the edge of the sheets loaded on the sheet processing tray so as to perform alignment in a width direction perpendicular to the conveying direction in the sheet conveying path. The aligning member aligns the sheets by moving so as to press the edge of the sheets from a standby position. The standby position of the aligning member is changed according to the discharge position in the width direction on the sheet processing tray.

The present invention can reduce the time of sheet alignment operation performed by the aligning members and can achieve high productivity.

Further features of the present invention will become apparent from the following description of exemplary embodiments (with reference to the attached drawings).

DESCRIPTION OF THE EMBODIMENTS

Embodiments of the present invention will now be described with reference to the drawings in detail.

First Embodiment

Figure 1:
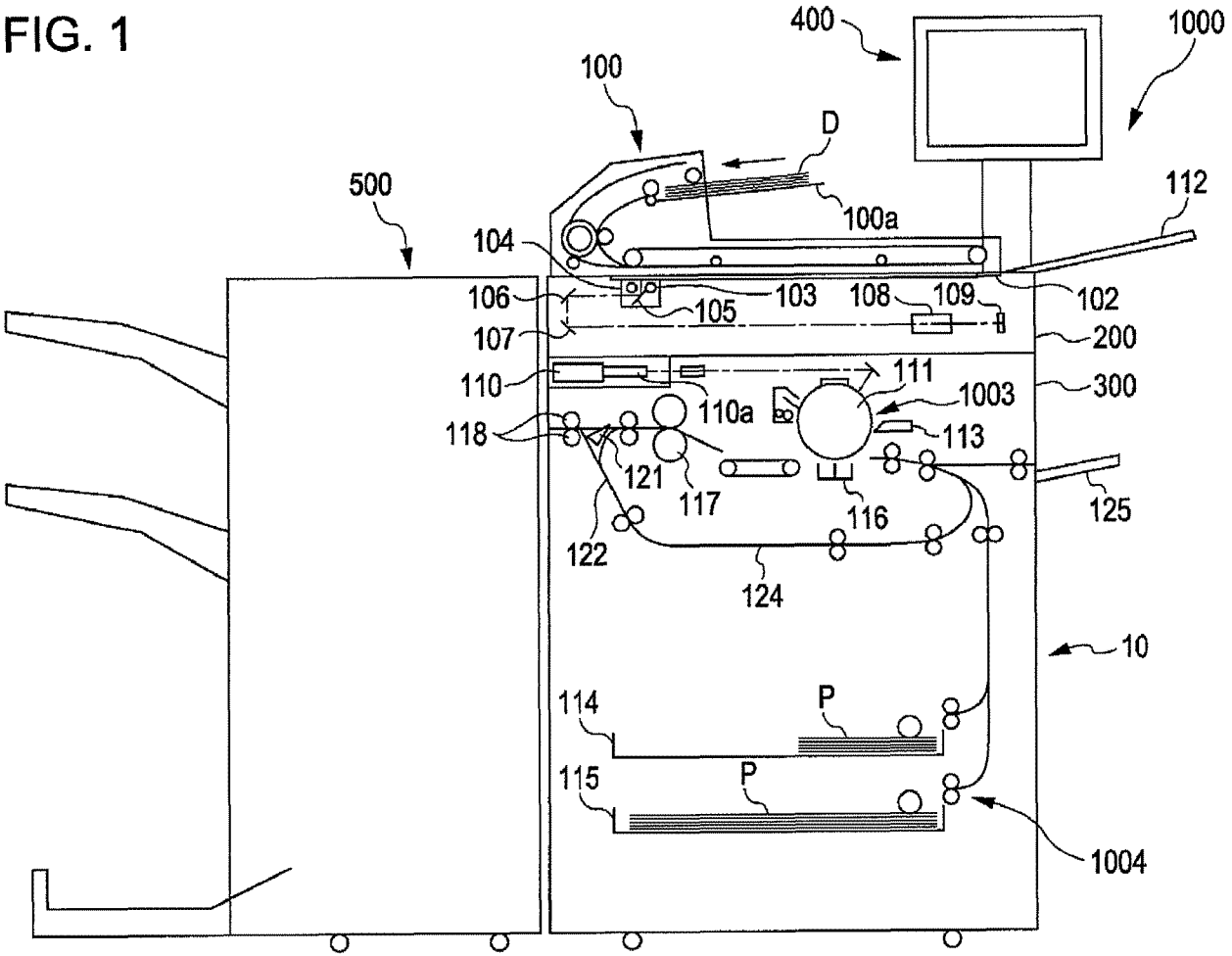
FIG. 1 is a sectional view of a photocopier that is an example of an image forming apparatus having a sheet processing apparatus according to a first embodiment of the present invention.

FIG. 1 is a sectional view of a photocopier that is an example of an image forming apparatus having a sheet processing apparatus according to a first embodiment of the present invention.

In the figure, reference numeral 1000 denotes a photocopier. The photocopier 1000 includes a photocopier body 10, a finisher 500 that is a sheet processing apparatus, and a scanner 200 disposed on the top of the photocopier body 10.

The scanner 200 scans documents. The scanner 200 includes a document feeder 100, a scanner unit 104, mirrors 105 to 107, a lens 108, and an image sensor 109. When the scanner 200 scans documents D, first, the documents D are placed on a tray 100a of the document feeder 100. The documents D are placed on the tray 100a with the side to be copied face up.

The document feeder 100 conveys the documents D from the initial page one by one to the left (in the direction of the arrow in the figure). After passing along a curved path, the documents D are conveyed on a platen glass 102 from the left to the right and then discharged onto a discharged paper tray 112.

When scanning the documents D being conveyed by the document feeder 100, the scanner unit 104 is held at a predetermined position. The documents D pass over the scanner unit 104 from the left to the right so as to be scanned.

In the scanning operation, when the documents D move across the platen glass 102, a lamp 103 of the scanner unit 104 irradiates the documents D with light. The reflection is guided to the image sensor 109 via the mirrors 105 to 107 and the lens 108. The image sensor 109 scans the image data of each document D line by line. After a predetermined image data processing is performed in an image signal control part 202 shown in FIG. 3, the image data is sent to an exposure control part 110.

The scanning of the documents can also be performed by stopping a document D being conveyed by the document feeder 100 on the platen glass 102 and then moving the scanner unit 104 from the left to the right. When a user scans a document without using the document feeder 100, the user lifts the document feeder 100 and places the document on the platen glass 102 so as to scan the document.

The photocopier body 10 includes a sheet feeding part 1004 and an image forming part 1003. The sheet feeding part 1004 feeds sheets P contained in cassettes 114 and 115. The image forming part 1003 forms images on the sheets P fed by the sheet feeding part 1002.

The image forming part 1003 includes a photosensitive drum 111, a developer 113, and a transfer charger 116. When an image is formed, the exposure control part 110 irradiates the photosensitive drum 111 with laser light, thereby forming a latent image on the photosensitive drum 111. The latent image is changed into a visible image, that is to say, a toner image by the developer 113. A fixing unit 117 and a discharge roller pair 118 are disposed on the downstream side of the image forming part 1003.

Reference numeral 400 denotes an operation display provided on the top of the photocopier body 10. The operation display 400 includes a plurality of keys for setting various functions concerning image formation and a display part that displays the information showing the setting.

Next, the image forming operation of the photocopier body 10 will be described.

As described above, the image sensor 109 of the scanner 200 scans the image data of the document D. After a predetermined image data processing is performed in the image signal control part 202, the image data is sent to the exposure control part 110. Next, the exposure control part 110 outputs laser light according to the image signal.

This laser light is scanned by a polygon mirror 110a, and the photosensitive drum 111 is irradiated with the laser light. In this way, an electrostatic latent image according to the scanned laser light is formed on the photosensitive drum 111. Next, the electrostatic latent image formed on the photosensitive drum 111 is changed into a visible image, that is to say, a toner image by the developer 113.

On the other hand, a sheet P is conveyed from one of the cassettes 114 and 115, a manual paper feeder 125, and a both side conveyance path 124 to a transfer part, which includes the photosensitive drum 111 and the transfer charger 116. In this transfer part, the toner image on the photosensitive drum 111 is transferred onto the sheet P. The transferred toner image is fixed to the sheet P in the fixing unit 117. Next, the sheet P with the fixed toner image is discharged into the finisher 500 by the discharge roller pair 118.

To discharge the sheet P from the photocopier body 10 with the toner image side face down, a flapper 121 guides the sheet P to a path 122 after the sheet P has passed through the fixing unit 117. Next, after the trailing edge of the sheet P has left the flapper 121, the sheet P is conveyed backward. The sheet P is guided to the discharge roller pair 118 by the flapper 121 and then discharged from the photocopier body 10.

Therefore, the sheet P is discharged from the photocopier body 10 with the toner image side face down. Such mode of discharge is called "reverse discharge." Since sheets P are discharged face down by the reverse discharge, when image formation is performed from the initial page, for example, when image formation is performed using the document feeder 100, the sheets P are ordered by page. In addition, in the case of image formation based on image data from a computer, sheets P are also ordered by page.

When a hard sheet P such as an OHP sheet is fed from the manual paper feeder 125 and an image is formed thereon, the sheet P is not guided to the path 122 and is discharged by the discharge roller pair 118 with the toner image side face up.

When images are formed on both sides of a sheet P, the sheet P is guided from the fixing unit 117 straight to the discharge roller pair 118. Just after the trailing edge of the sheet P has left the flapper 121, the sheet P is conveyed backward and guided by the flapper 121 to the path 122 and the both side conveyance path 124.

The sheets discharged from the photocopier body 10 are then taken in the finisher 500. The finisher 500 is a sheet processing apparatus that staples or binds the sheets on which images are formed.

Figure 2:
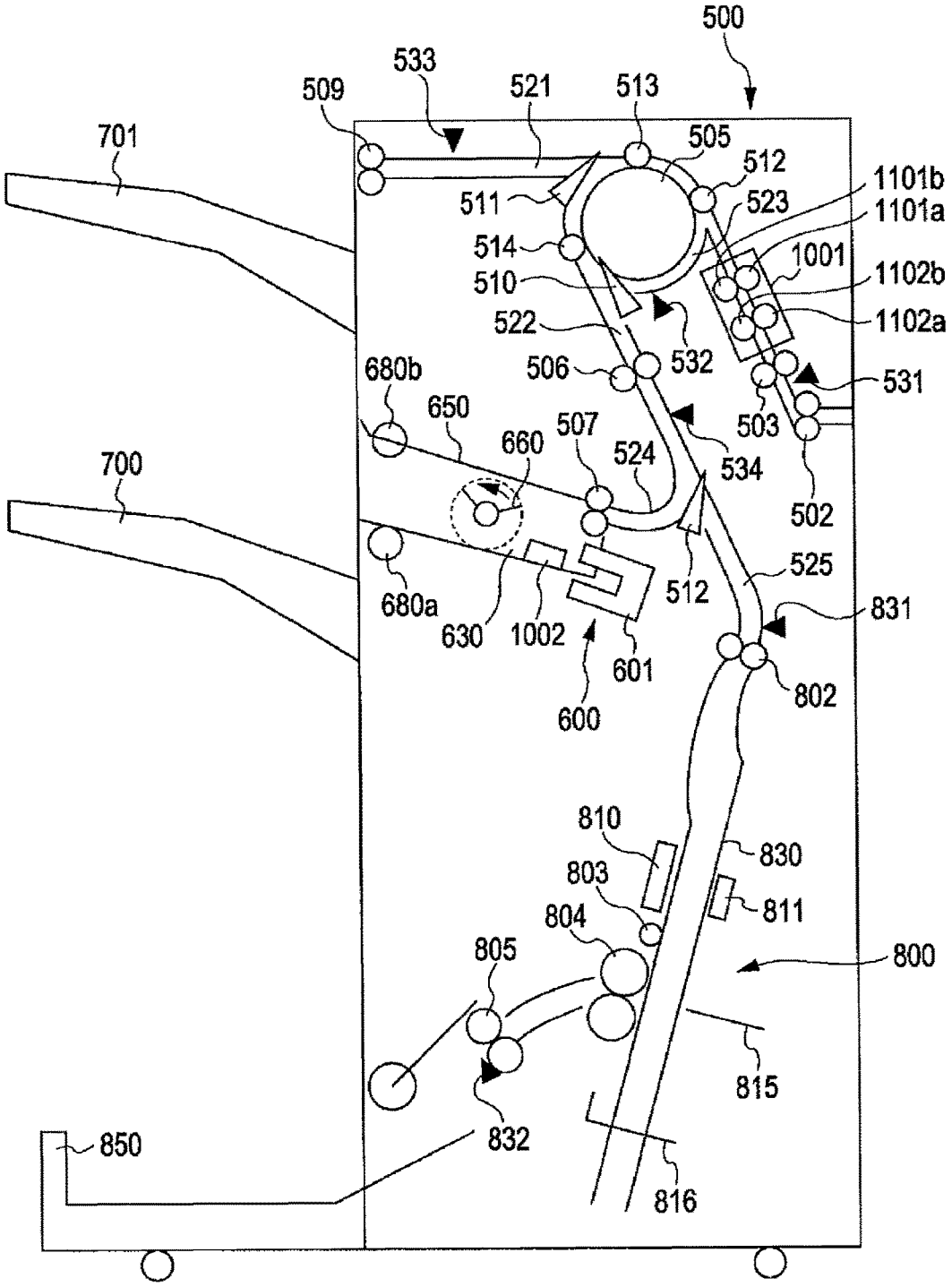
FIG. 2 illustrates the structure of a finisher serving as the sheet processing apparatus.

Next, the structure of the finisher 500 will be descried with reference to FIG. 2.

The finisher 500 takes in sheets from the photocopier body 10 and performs various processes such as a process to align the sheets and form a sheet stack, a sort process, a non-sort process, a stapling process to place staples at the trailing edge of the sheet stack, and a binding process. The finisher 500 includes a stapling part 600 and a binding part 800. The stapling part 600 staples a sheet stack. The binding part 800 folds a sheet stack in half and binds them.

The stapling part 600 includes a process tray (sheet processing tray) 630 and a pair of aligning plates (aligning members) 1002. The process tray 630 is loaded with a sheet stack. The aligning plates 1002 align the sheet stack on the process tray 630 in the width direction. The stapling part 600 further includes a stapler 601 that staples the sheet stack.

The binding part 800 includes a binding entrance sensor 831, two pairs of staplers 810, and a binding intermediate tray (hereinafter referred to as "binding tray") 830 in which sheets are loaded. The binding tray 830 is provided with an intermediate roller 803 and a movable sheet-positioning member 816.

An anvil 811 is provided opposite the two pairs of staplers 810. The staplers 810 staples a sheet stack in the binding tray 830 in cooperation with the anvil 811.

A folding roller pair 804 and a pushing member 815 are provided on the downstream side of the staplers 810. The pushing member 815 is opposite the folding roller pair 804. The pushing member 815 pushes the sheet stack in the binding tray 830 into the folding roller pair 804. A discharged paper sensor 832 is provided on the downstream side of a conveying roller pair 805.

The finisher 500 further includes an entrance roller pair 502 for taking in the sheets conveyed from the photocopier body 10. An entrance sensor 531 is provided between the entrance roller pair 502 and a conveying roller pair 503.

A lateral register correction unit 1001 is provided between the conveying roller pair 503 and a buffer roller 505. The lateral register correction unit 1001 operates in the shift sort mode in which discharged sheet stacks are offset. The lateral register correction unit 1001 is a shift conveying unit that conveys a sheet, shifting the sheet to a predetermined position in the width direction. In the shift sort mode, the lateral register correction unit 1001 corrects the lateral registration of all sheets taken in the finisher 500 and conveys the sheets, shifting the sheets to a predetermined position in the width direction. The lateral register correction unit 1001 includes conveying rollers 1101a and 1102a and driven rollers 1101b and 1102b pressed against the conveying rollers 1101a and 1102a, respectively.

The buffer roller 505 is provided on the downstream side of the lateral register correction unit 1001. A predetermined number of sheets conveyed via the conveying roller pair 503 and the lateral register correction unit 1001 can be wrapped around the buffer roller 505. The sheets are wrapped around the buffer roller 505 by the pressing rollers 512, 513, and 514 and are conveyed in the direction in which the buffer roller 505 rotates.

A switching flapper 511 is provided between the pressing rollers 513 and 514. Another switching flapper 510 is provided below the switching flapper 511. The switching flapper 511 selectively guides the sheets wrapped around the buffer roller 505 to a sort path 522 or a non-sort path 521. When guided to the non-sort path 521, the sheets are peeled off the buffer roller 505. Reference numeral 533 denotes a discharged paper sensor provided in the non-sort path 521.

The switching flapper 510 selectively guides the sheets wrapped around the buffer roller 505 to the sort path 522 or a buffer path 523. When guided to the sort path 522, the sheets are peeled off the buffer roller 505. When guided to the buffer path 523, the sheets remain wrapped around the buffer roller 505. A buffer path sensor 532 is provided in the buffer path 523. The buffer path sensor 532 detects the sheets in the buffer path 523.

Another switching flapper 512 is disposed on the downstream side of the sort path 522. The sheets guided to the sort path 522 is then guided to the sort discharge path 524 or the binding path 525 by the switching flapper 512.

The sheets guided to the sort discharge path 524 pass through a conveying roller pair 507 and are then loaded on the process tray 630. The sheet stack loaded on the process tray 630 is aligned and stapled, if necessary, and then discharged onto the stack tray (discharge tray) 700 by discharge rollers (discharge members) 680a and 680b. In the shift sort mode, a plurality of sheet stacks are loaded on the stack tray 700. The sheet stacks are loaded alternately at two positions that differ in the width direction perpendicular to the conveying direction.

The discharge roller 680b is supported by a swing guide 650. The swing guide 650 is swung by a swing motor (not shown) so that the discharge roller 680b comes into contact with the uppermost sheet on the process tray 630. When the discharge roller 680b is in contact with the uppermost sheet on the process tray 630, the discharge roller 680b can discharge the sheet stack on the process tray 630 onto the stack tray 700 in cooperation with the other discharge roller 680a.

In the finisher 500 having such a structure, when a sheet is discharged from the photocopier body 10, the sheet is first passed to the entrance roller pair 502. At this time, simultaneously, the timing when the sheet is passed is detected by the entrance sensor 531.

After being conveyed by the entrance roller pair 502, the sheet is conveyed by the lateral register correction unit 1001, being shifted in the width direction. Next, the sheet is conveyed to the buffer roller 505. With the rotation of the buffer roller 505, the sheet is wrapped around the buffer roller 505 by the pressing rollers 512, 513, and 514 and conveyed in the direction in which the buffer roller 505 rotates. The shifting operation of the lateral register correction unit 1001 will hereinafter be described.

When the non-sort process is performed, the sheet is peeled off the buffer roller 505 and guided to the non-sort path 521 by the switching flapper 511. The sheet is then discharged onto the sample tray 701 by the discharge roller pair 509.

When the sorting process, the stapling process, or the binding process is performed, a set of a predetermined number of sheets is conveyed to the stapling part 600, for example. For this purpose, a sheet is first sent to the buffer path 523 by the switching flappers 511 and 510, being wrapped around the buffer roller 505. In the same way, a predetermined number of sheets are sent to the buffer path 523, being wrapped around the buffer roller 505.

After a predetermined number of sheets have been sent to the buffer path 523, these sheets are peeled off the buffer roller 505 by the switching flapper 510 and sent to the sort path 522. The sheets conveyed to the sort path 522 pass through the conveying roller pair 506 and are then guided to the sort discharge path 524 or the binding path 525 by the switching flapper 512.

When guided to the sort discharge path 524 by the switching flapper 512, the sheets are stacked on the process tray 630. The sheets stacked on the process tray 630 are aligned by the pair of aligning plates 1002 and stapled by the stapler 601 according to the setting from the operation display 400 shown in FIG. 1.

Every sheet stack that has been aligned by the aligning plates 1002 and stapled by the stapler 601 is discharged onto the stack tray 700 by the discharge rollers 680a and 680b. Also in the shift sort mode, every sheet stack is aligned by the aligning plates 1002 and discharged onto the stack tray 700 by the discharge rollers 680a and 680b.

This stapling process is performed by the stapler 601. This stapler 601 is movable along the edge of the process tray 630. Therefore, the sheets stacked on the process tray 630 can be stapled at the rearmost position (trailing edge) of the sheets in the sheet conveying direction (leftward direction in FIG. 2).

On the other hand, the sheets guided to the binding path 525 by the switching flapper 512 are conveyed to the binding intermediate tray 830 by a conveying roller pair 802 and stapled by the staplers 810 and the anvil 811. Next, being pushed by the pushing member 815 into the space between the folding roller pair 804, the sheet stack is folded and conveyed downstream by the folding roller pair 804. The folded sheet stack is discharged onto a discharged paper tray 850 by the conveying roller pair 805.

Figure 3:
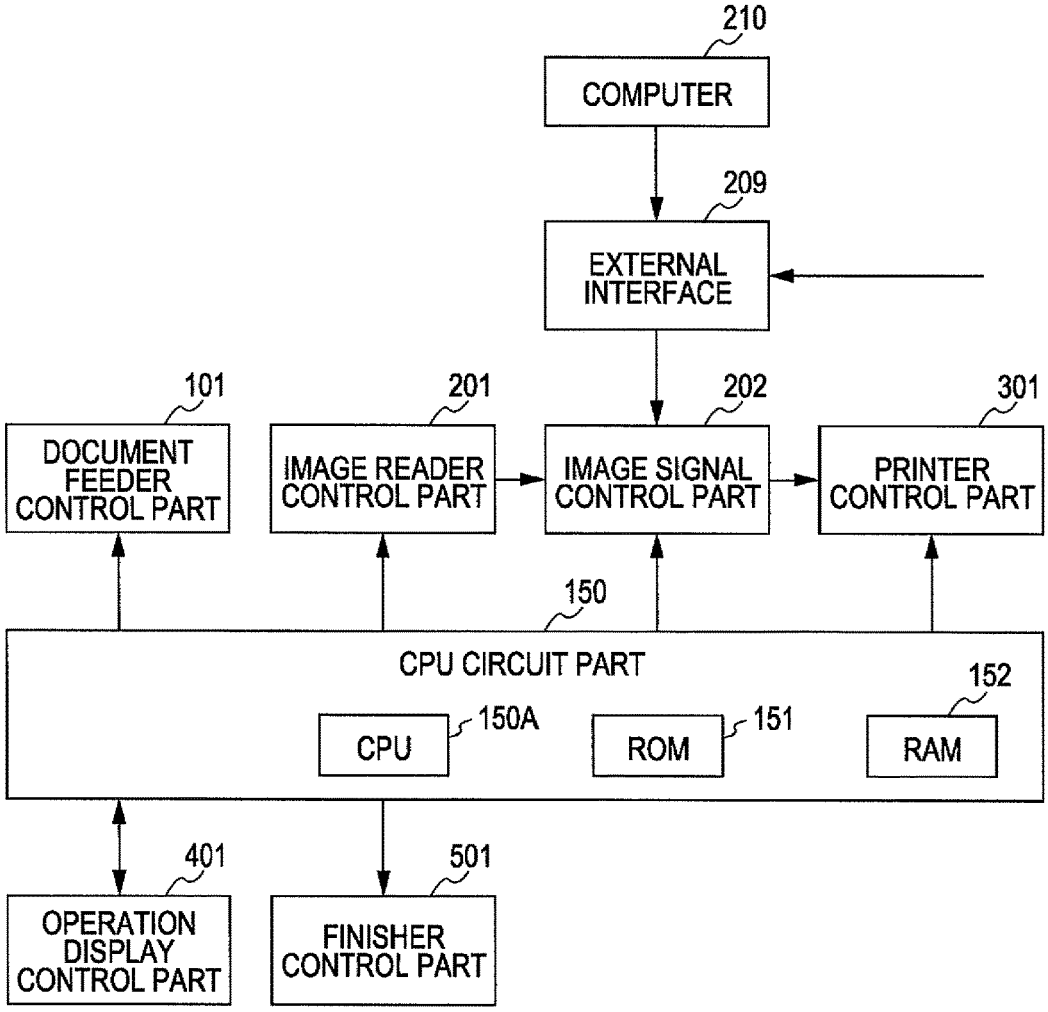
FIG. 3 is a control block diagram of the entire photocopier including the finisher.

FIG. 3 is a control block diagram of the entire photocopier including the finisher 500. In FIG. 3, reference numeral 150 denotes a CPU circuit part. This CPU circuit part 150 includes a CPU 150A, a ROM 151, and a RAM 152 and controls blocks 101, 201, 202, 209, 301, 401, and 501 according to the control program stored in the ROM 151. The RAM 152 temporarily stores the control data and is used as a work area for arithmetic processing necessary for the control.

The document feeder control part 101 drives and controls the document feeder 100 on the basis of the instructions from the CPU circuit part 150. The image reader control part 201 drives and controls the scanner unit 104, the image sensor 109, and other components of the scanner 200, and sends an analog image signal received from the image sensor 109 to the image signal control part 202.

The image signal control part 202 converts the analog image signal received from the image sensor 109 into a digital signal. Next, the image signal control part 202 performs various processes so as to convert this digital signal into a video signal and then sends the video signal to the printer control part 301. In addition, when the image signal control part 202 receives a digital image signal from an external computer 210 through an external interface 209, the image signal control part 202 performs various processes so as to convert this digital image signal into a video signal and then sends the video signal to the printer control part 301. The processing operation of the image signal control part 202 is controlled by the CPU circuit part 150.

The printer control part 301 drives the exposure control part 110 on the basis of the video signal received from the image signal control part 202. The operation display control part 401 performs information exchange between the operation display 400 shown in FIG. 1 and the CPU circuit part 150. The operation display control part 401 receives key signals corresponding to key operation from the operation display 400 and sends the key signals to the CPU circuit part 150. On the other hand, the operation display control part 401 receives signals from the CPU circuit part 150 and displays the corresponding information on the screen of the operation display 400.

The finisher control part 501 is provided, for example, in the finisher 500 and drives and controls the entire finisher by exchanging information with the CPU circuit part 150. Alternatively, the finisher control part 501 may be provided in the photocopier body 10.

Figure 4:
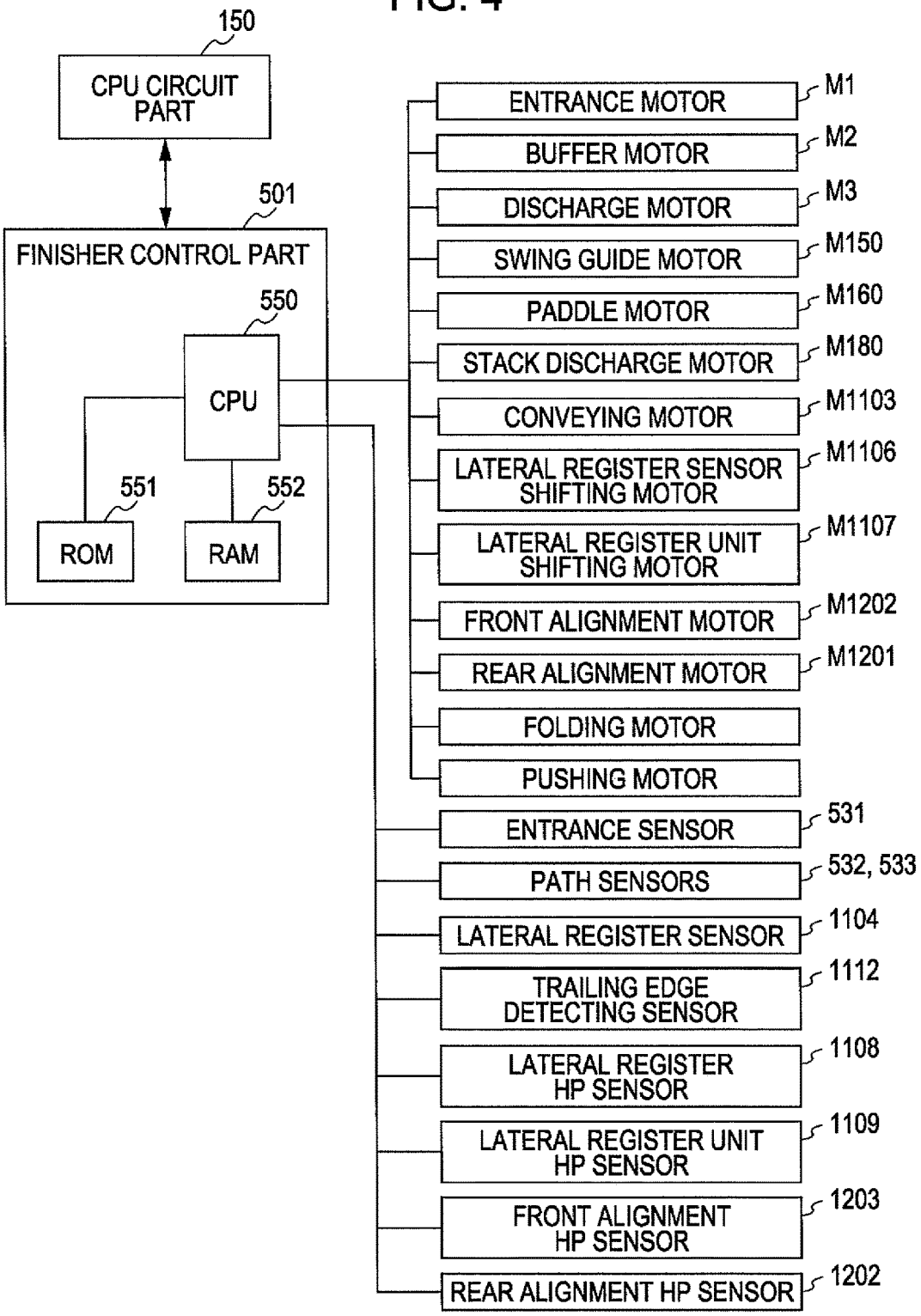
FIG. 4 is a control block diagram of a finisher control part of the finisher.

FIG. 4 is a control block diagram of the finisher control part 501. The finisher control part 501 includes a CPU 550, a ROM 551, and a RAM 552. The finisher control part 501 communicates with the CPU circuit part 150 in the photocopier body 10 via a communication IC (not shown) so as to exchange information. On the basis of the instructions from the CPU circuit part 150, the finisher control part 501 executes various programs stored in the ROM 551 so as to drive and control the finisher 500.

Figure 5:
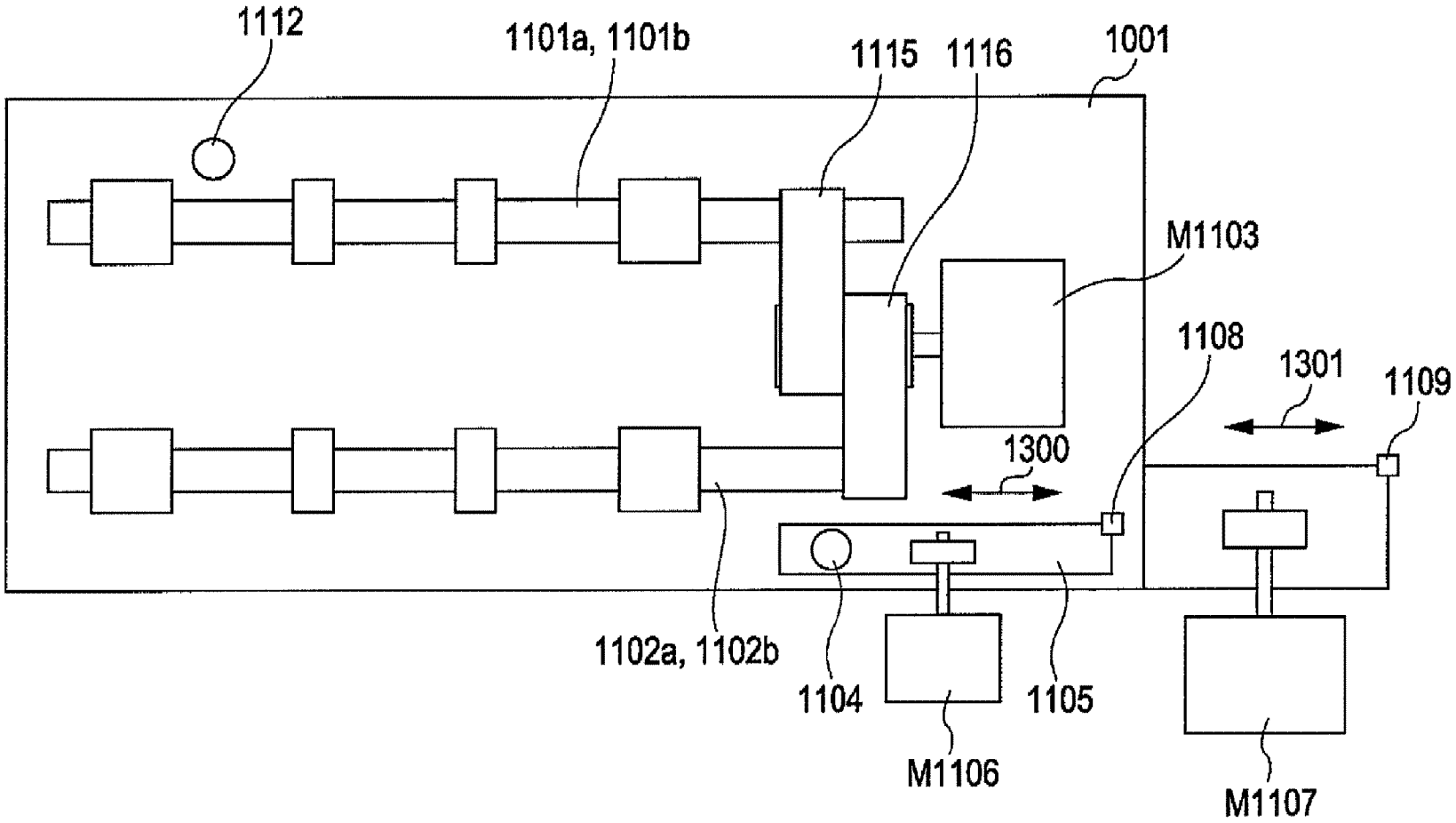
FIG. 5 is a schematic view showing the structure of a lateral register correction unit provided in the finisher.

FIG. 5 is a schematic view showing the structure of the lateral register correction unit 1001. Conveying a sheet in the sheet conveying direction, the lateral register correction unit 1001 shifts the sheet in the direction perpendicular to the sheet conveying direction (hereinafter referred to as "width direction"). In FIG. 5, reference numeral M1103 denotes a conveying motor. The conveying motor M1103 drives the conveying rollers 1101a and 1102a via timing belts 1115 and 1116. The conveying rollers 1101a and 1102a convey sheets together with the driven rollers 1101b and 1102b.

Reference numeral 1104 denotes a lateral register sensor. The lateral register sensor 1104 is a position detecting device that detects the position of the edge of a sheet being conveyed. The lateral register sensor 1104 is mounted in a lateral register sensor unit 1105. The lateral register sensor unit 1105 is moved from side to side as shown by arrow 1300 by a lateral register sensor shifting motor M1106. The home position of the lateral register sensor unit 1105 is detected by a lateral register HP sensor 1108.

The lateral register correction unit 1001 is not integral with the lateral register sensor unit 1105. Reference numeral M1107 denotes a lateral register correction unit shifting motor, which moves the lateral register correction unit 1001 from side to side as shown by arrow 1301. The home position of the lateral register correction unit 1001 is detected by a lateral register correction unit HP sensor 1109.

Reference numeral 1112 denotes a trailing edge detecting sensor. The trailing edge detecting sensor 1112 detects an incoming sheet and detects that the trailing edge of the sheet has passed between the conveying rollers 1101a and 1101b in the lateral register correction unit 1001.

Next, the lateral register correcting operation of the lateral register correction unit 1001 having such a structure will be described.

First, with reference to FIGS. 6A, 6B, 7A, and 7B, the case where a sheet is shifted to the left in the figures in the conveying path will be described.

Figure 6A:
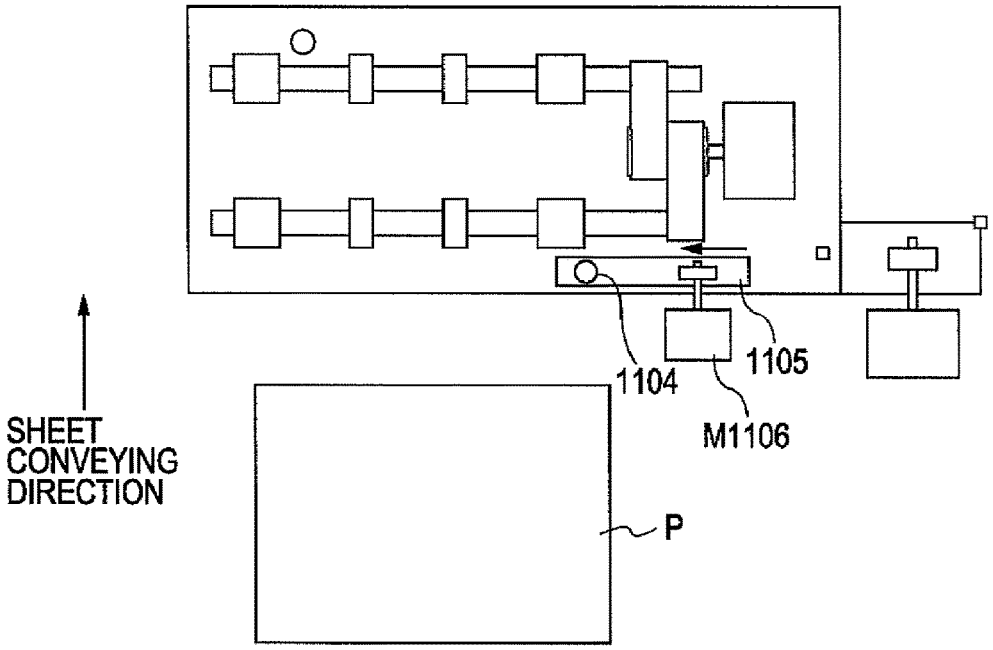
FIGS. 6A and 6B illustrate the operation to shift a sheet to the left in the conveying path in the lateral register correction unit.

First, when a sheet P approaches the lateral register correction unit 1001 as shown in FIG. 6A, the lateral register sensor shifting motor M1106 is activated. The lateral register sensor unit 1105 is thereby moved leftward as shown by the arrow from the home position to a standby position that is predetermined on the basis of the sheet size and the offset distance.

Figure 6B:
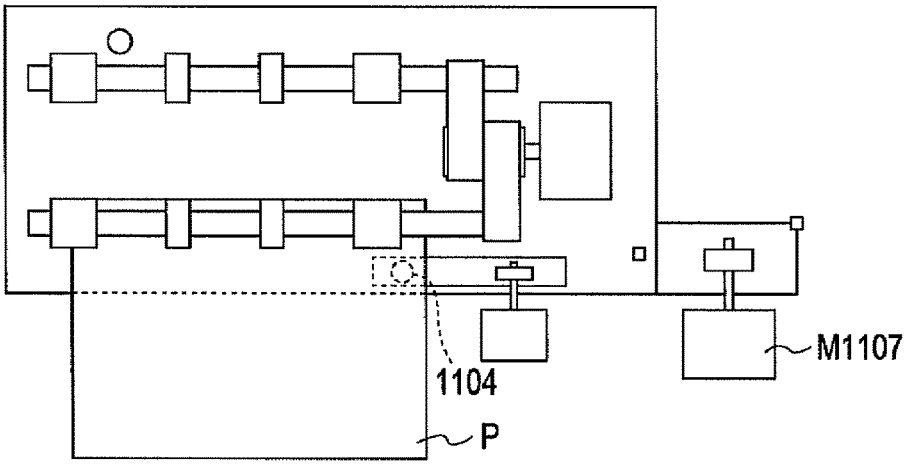
Figure 7A:
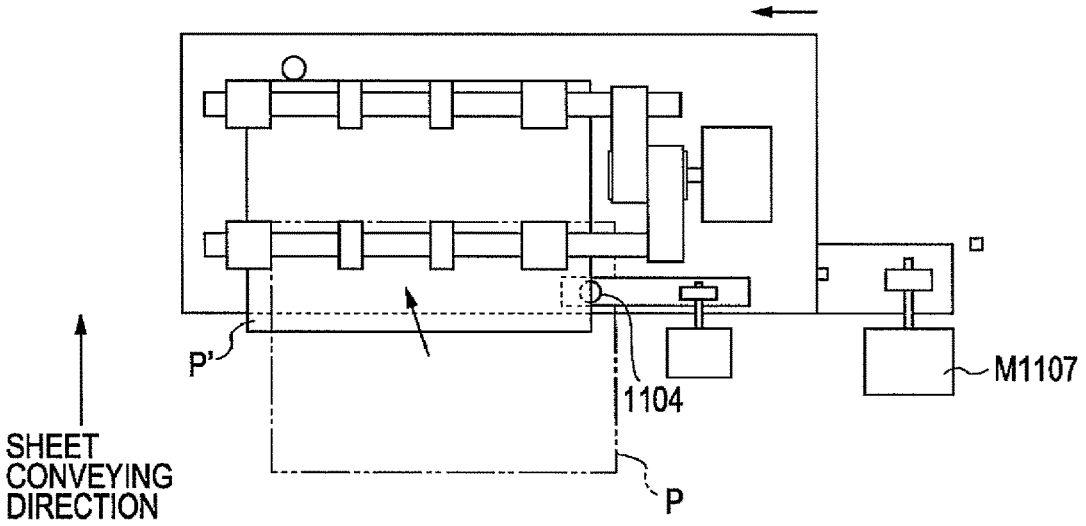
FIGS. 7A and 7B also illustrate the operation to shift a sheet to the left in the conveying path in the lateral register correction unit.
Figure 7B:
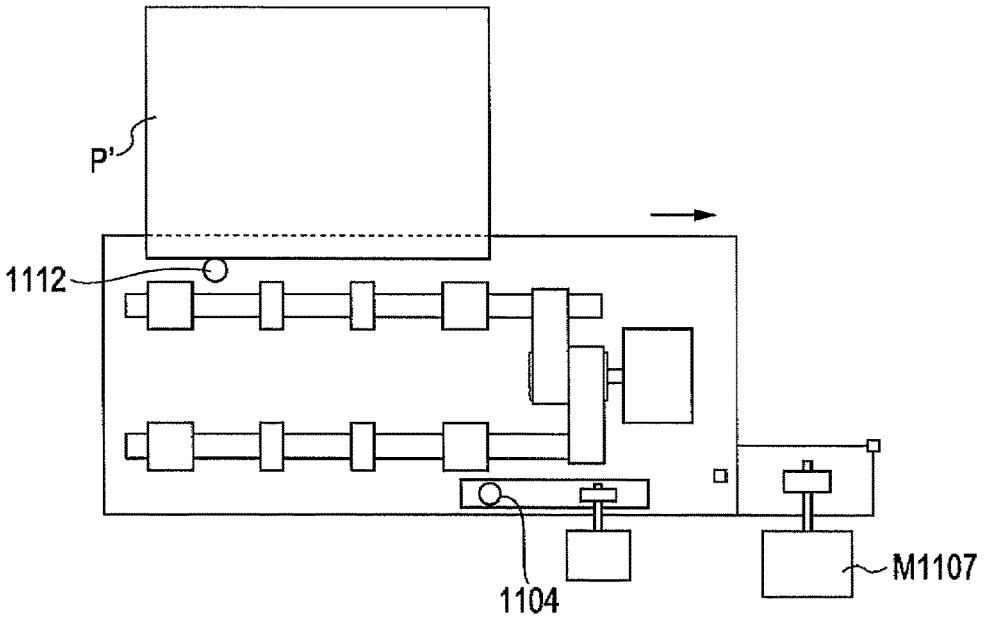

Next, when the sheet P enters the lateral register correction unit 1001 as shown in FIG. 6B and is detected by the lateral register sensor 1104, the lateral register correction unit shifting motor M1107 is activated and starts to move the lateral register correction unit 1001 to the left as shown by the arrow in FIG. 7A. The sheet P thereby starts to be moved to the left, being conveyed. Soon afterward, the side edge of the sheet P passes over the lateral register sensor 1104, and the lateral register sensor 1104 thereby stops detecting the sheet P.

When the lateral register sensor 1104 stops detecting the sheet P, in other wards, when the lateral register sensor 1104 detects the side edge of the sheet P, the lateral register correction unit shifting motor M1107 is stopped. By this operation, the lateral register of the sheet P is corrected, and the sheet P is shifted to a predetermined position shown by reference letter P'.

The sheet P remains being conveyed. When the trailing edge detecting sensor 1112 detects the trailing edge of the sheet P, the lateral register correction unit shifting motor M1107 moves the lateral register correction unit 1001 to the right as shown by the arrow in FIG. 7B so as to return the lateral register correction unit 1001 to the home position shown in FIGS. 6A and 6B.

Next, with reference to FIGS. 8A, 8B, 9A, and 9B, the case where a sheet is shifted to the right in the conveying path will be described.

Figure 8A:
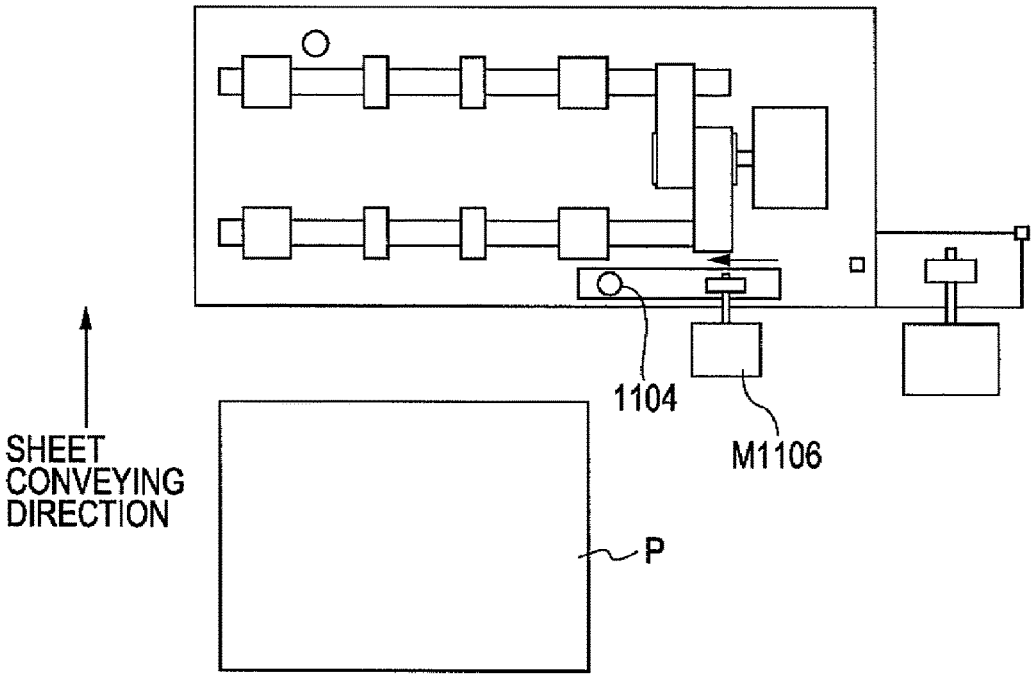
FIGS. 8A and 8B illustrate the operation to shift a sheet to the right in the conveying path in the lateral register correction unit.

First, when a sheet P approaches the lateral register correction unit 1001 as shown in FIG. 8A, the lateral register sensor shifting motor M1106 is activated. The lateral register sensor unit 1105 is thereby moved leftward as shown by the arrow from the home position to a standby position that is predetermined on the basis of the sheet size and the offset distance.

Figure 8B:
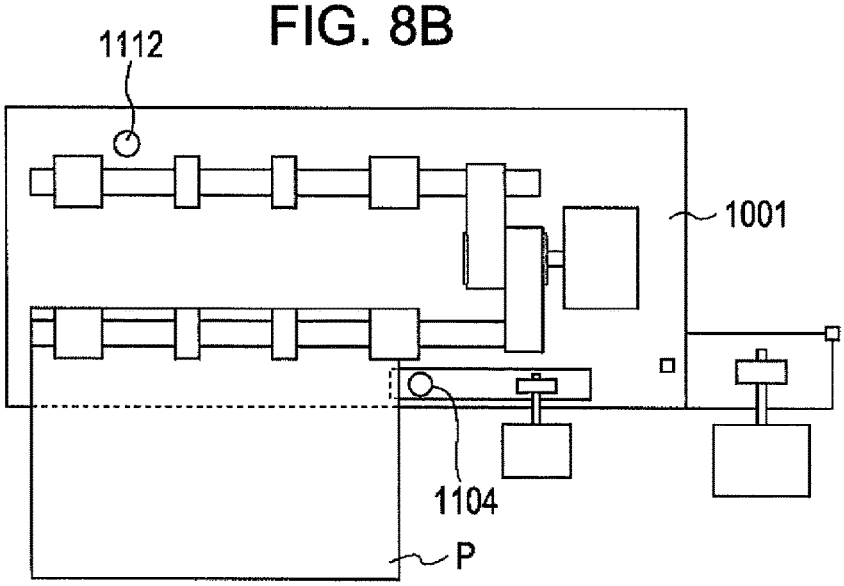
Figure 9A:
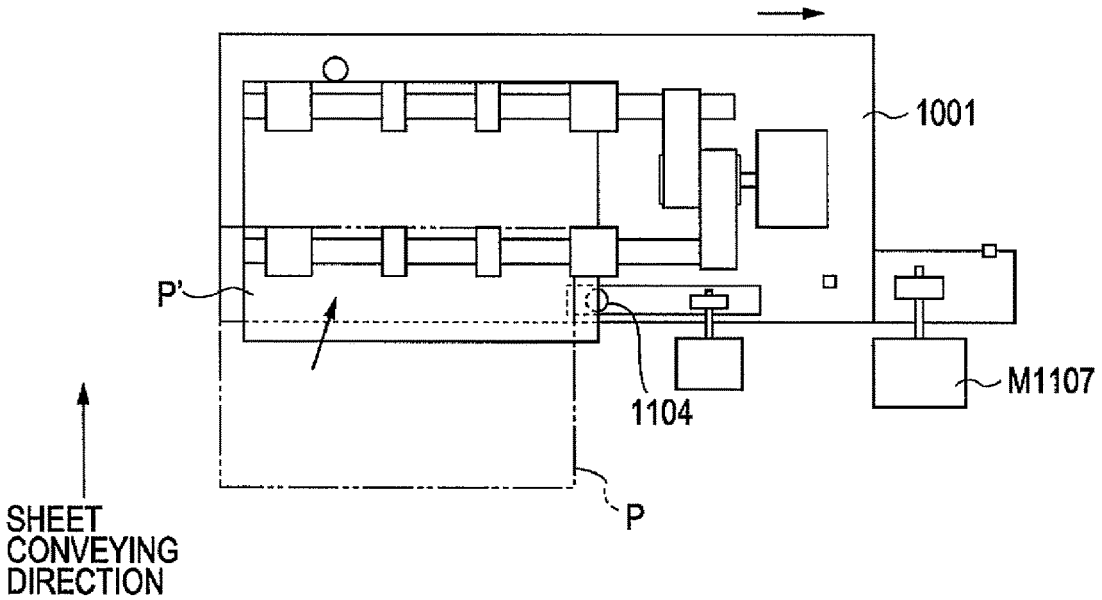
FIGS. 9A and 9B also illustrate the operation to shift a sheet to the right in the conveying path in the lateral register correction unit.
Figure 9B:
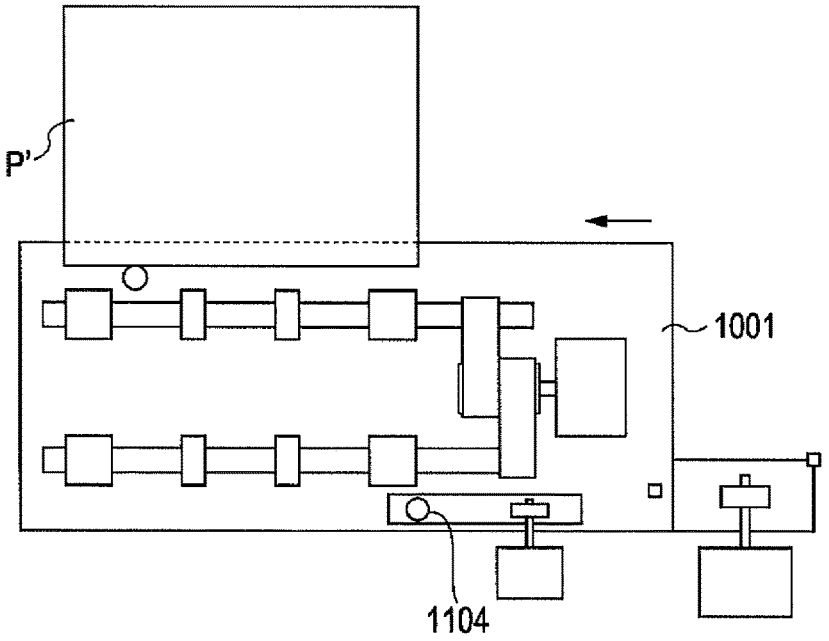

Next, when the sheet P enters the lateral register correction unit 1001 as shown in FIG. 8B and the leading edge of the sheet P is detected by the trailing edge detecting sensor 1112, the lateral register correction unit shifting motor M1107 is activated and starts to move the lateral register correction unit 1001 to the right as shown by the arrow in FIG. 9A.

The sheet P thereby starts to be moved to the right, being conveyed. Soon afterward, the side edge of the sheet P is detected by the lateral register sensor 1104. When the lateral register sensor 1104 detects the side edge of the sheet P, the lateral register correction unit shifting motor M1107 is stopped. By this operation, the lateral register of the sheet P is corrected, and the sheet P is shifted to a predetermined position shown by reference letter P'.

The sheet P remains being conveyed. When the trailing edge detecting sensor 1112 detects the trailing edge of the sheet P, the lateral register correction unit shifting motor M1107 moves the lateral register correction unit 1001 to the left as shown by the arrow in FIG. 9B so as to return the lateral register correction unit 1001 to the home position shown in FIGS. 8A and 8B.

In this embodiment, after the lateral register correcting operation is performed by the lateral register correction unit 1001, the sheet is conveyed to the process tray 630 of the finisher 500. In this process tray 630, alignment operation is performed.

Figure 10:
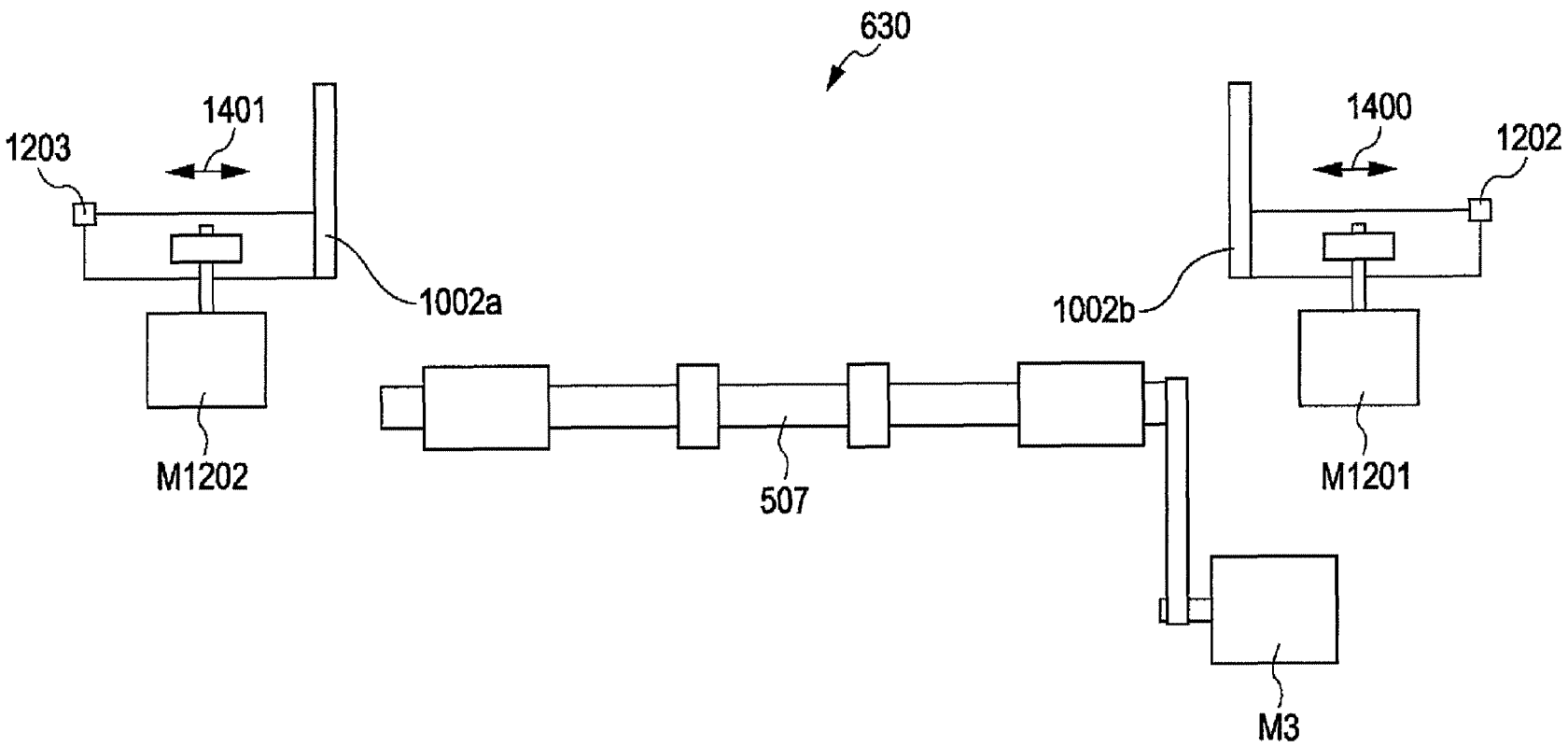
FIG. 10 shows the configuration of a process tray provided in the finisher.

FIG. 10 shows the configuration of the process tray 630 and aligning plates that align the sheets stacked on the process tray 630. In FIG. 10, reference numeral M3 denotes a discharge motor. Being driven by this discharge motor M3, the conveying roller pair 507 discharges the sheets onto the process tray 630.

Reference numerals M1202 and M1201 denote a front alignment motor and a rear alignment motor, respectively. The front alignment motor M1202 and the rear alignment motor M1201 drive a front aligning plate 1002a and a rear aligning plate 1002b, respectively. The front aligning plate 1002a and the rear aligning plate 1002b constitute a pair of aligning plates and are independently driven in the direction shown by arrows 1400 and 1401 so as to align the sheets. Reference numerals 1203 and 1202 denote a front alignment HP sensor and a rear alignment HP sensor, respectively. The front alignment HP sensor 1203 and the rear alignment HP sensor 1202 detect the home positions of the front aligning plate 1002a and the rear aligning plate 1002b, respectively.

Next, the alignment operation according to this embodiment will be described. Before that, the alignment operation in the shift sort mode in the case where the lateral register correction is not performed by the lateral register correction unit 1001 will be described with reference to FIGS. 11A, 11B, and 12.

In this embodiment, when the shift sort mode is selected, a sheet stack P conveyed onto the process tray 630 is shifted by a stack offset distance La and aligned before the sheet stack P is discharged onto the discharge tray 700. By switching the shifting direction between forward and backward (leftward and rightward in the figures) stack by stack, sheet stacks can be sorted.

Figure 11A:
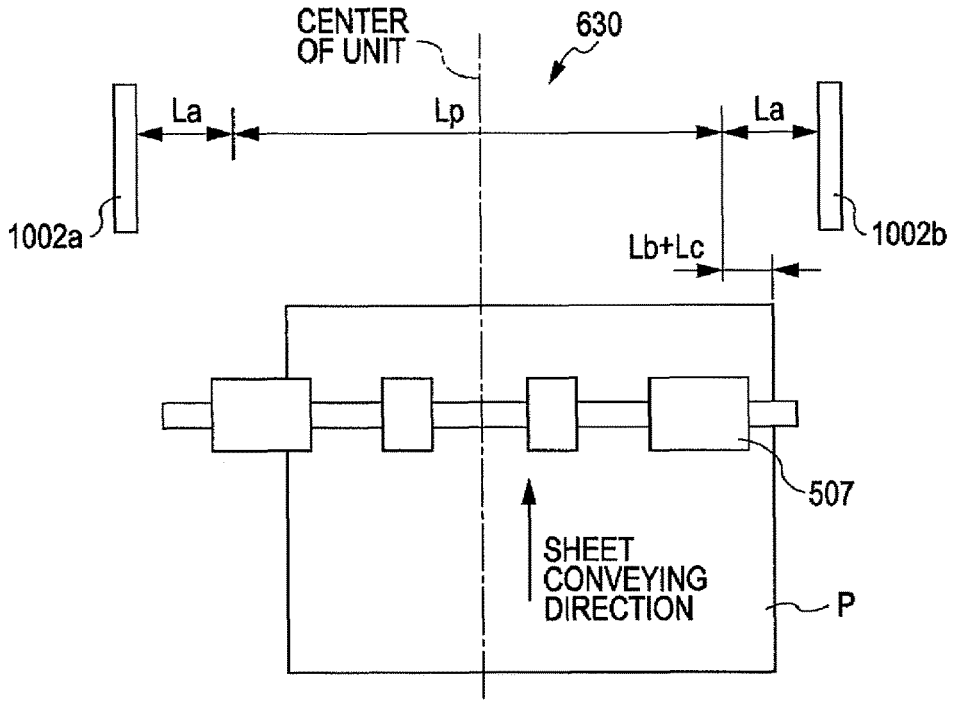
FIGS. 11A and 11B illustrate the alignment operation performed by aligning members provided in the finisher in the case where the lateral register correction is not performed by the lateral register correction unit.

As shown in FIG. 11A, when the shift sort mode is selected, the front aligning plate 1002a and the rear aligning plate 1002b first stand by at their respective standby positions. The standby positions are at equal distances from the center of the unit. The distance between the standby positions is the sum of the sheet width Lp and twice the stack offset distance La. When the distance of lateral register displacement that occurs in the photocopier body 10 is Lb, and the distance of lateral register displacement that occurs in the finisher 500 is Lc, the stack offset distance La is set so as to be larger than the sum of the distances of these lateral register displacements. That is to say, La>Lb+Lc.

Therefore, even if the distance of lateral register displacement (Lb+Lc) is the maximum, a sheet stack P conveyed onto the process tray 630 does not collide with the aligning plate 1002a or 1002b at the standby position to cause conveyance failure.

Figure 11B:
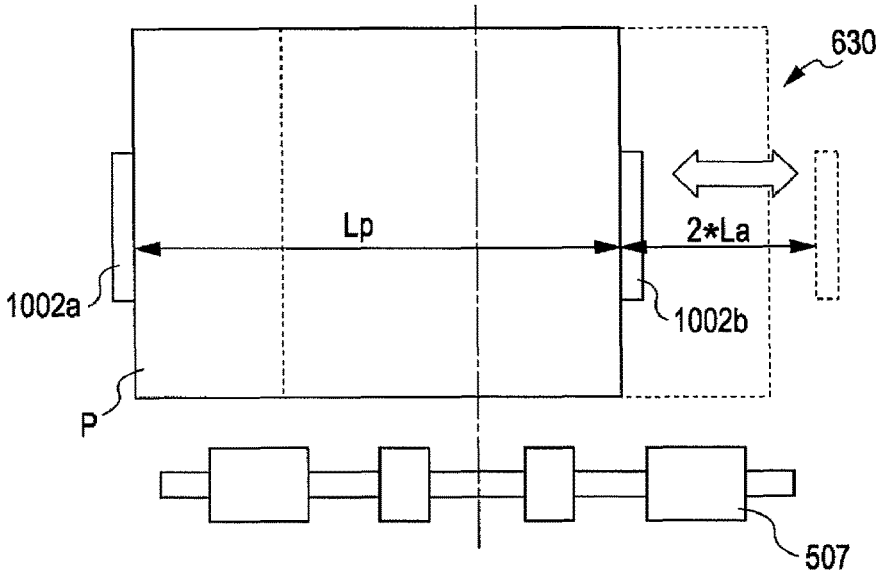

For example, when a sheet stack P is offset forward by La and aligned, as shown in FIG. 11B, the front aligning plate 1002a remains at the standby position and functions as a standard. After the sheet stack P has entered the process tray 630, the rear aligning plate 1002b reciprocates a distance approximately twice as long as the offset distance La. The sheet stack P is thereby pressed against the front aligning plate 1002a so as to be aligned (one side standard).

Figure 12:
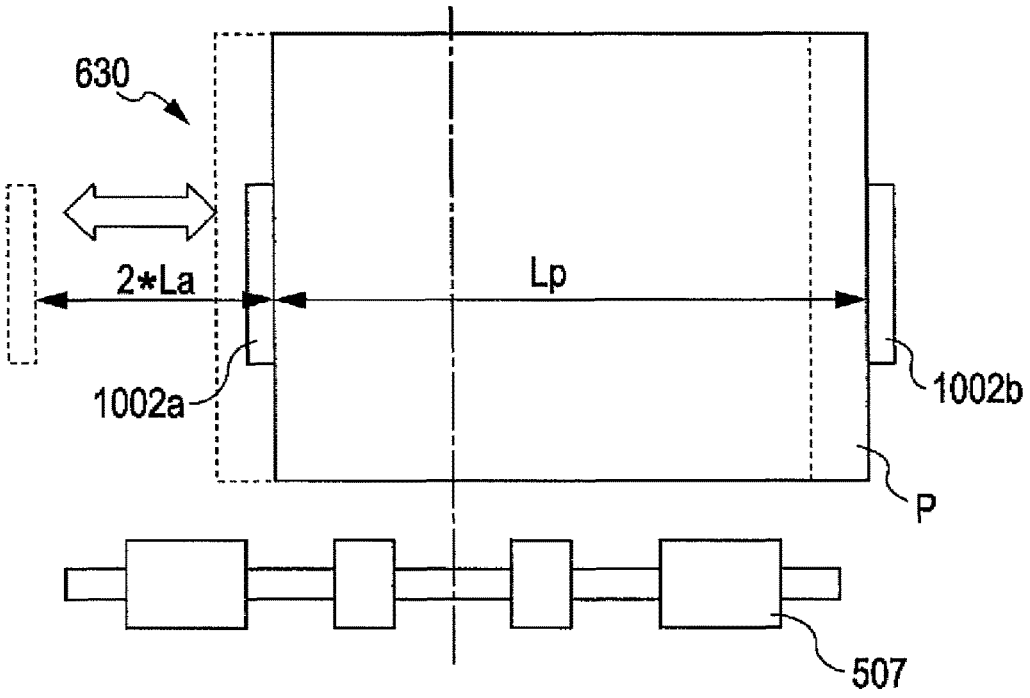
FIG. 12 also illustrates the alignment operation performed by the aligning members in the case where the lateral register correction is not performed by the lateral register correction unit.

When another sheet stack P is offset backward by La and aligned, as shown in FIG. 12, the rear aligning plate 1002b remains at the standby position and functions as a standard. After the sheet stack P has entered the process tray 630, the front aligning plate 1002a reciprocates a distance approximately twice as long as the offset distance La. The sheet stack P is thereby pressed against the rear aligning plate 1002b so as to be aligned (one side standard).

Next, the alignment operation in the shift sort mode in the case where the lateral register correction is performed by the lateral register correction unit 1001 in the finisher 500 will be described with reference to FIGS. 13A, 13B, and 14.

Figure 13A:
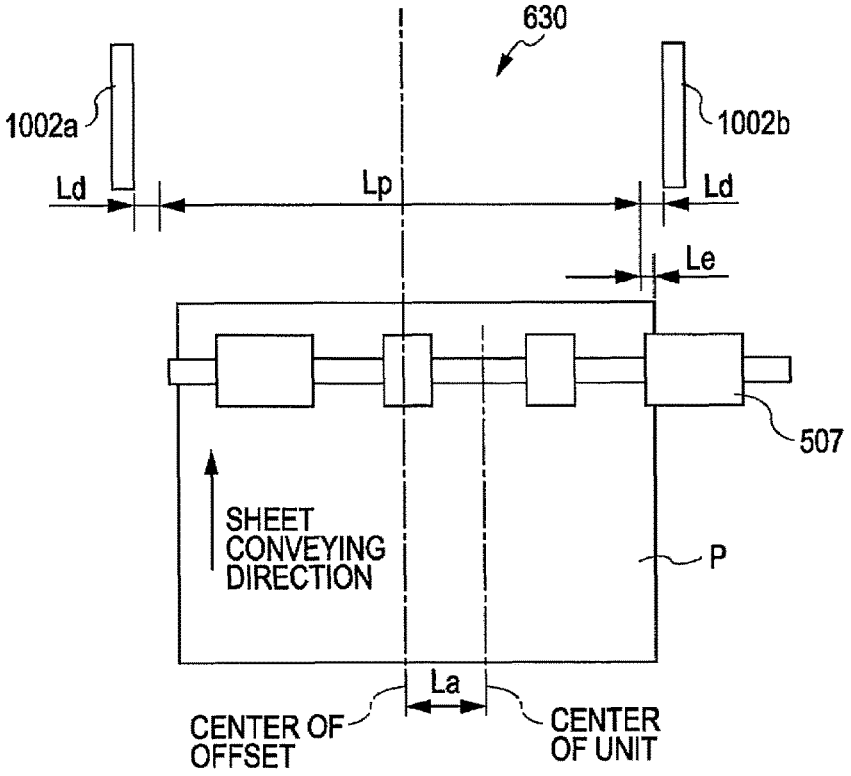
FIGS. 13A and 13B illustrate the alignment operation performed by the aligning members in the case where the lateral register correction is performed by the lateral register correction unit.

FIG. 13A shows first standby positions of the aligning plates 1002a and 1002b in the case where a sheet stack is offset forward and aligned. Before the sheet stack P is conveyed onto the process tray 630, the lateral register displacement Lb that occurs in the photocopier body 10 has been corrected by the operation of the lateral register correction unit 1001. In addition, the sheet stack P has been shifted by the stack offset distance La by the operation of the lateral register correction unit 1001. Being offset by the lateral register correction unit 1001, the sheet stack P is loaded at the front loading position (first loading position) shown in FIGS. 13A and 13B.

Therefore, the alignment distance Ld of each of the aligning plates 1002a and 1002b is set slightly larger than the distance Le of the displacement that occurs in the conveying path from the lateral register correction unit 1001 to the process tray 630 in the finisher 500 (Ld>Le). Therefore, the sheet stack P does not collide with the aligning plate 1002a or 1002b at the standby position to cause conveyance failure.

Figure 13B:
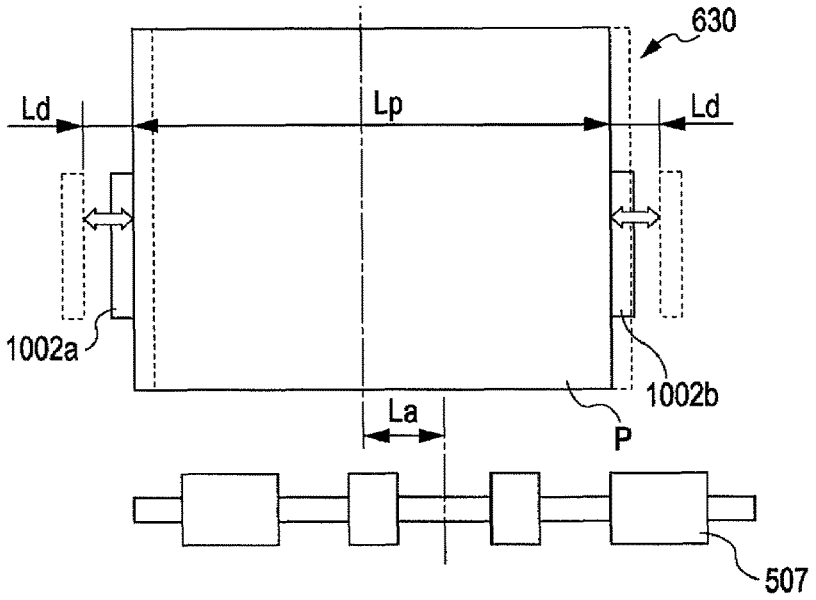

After the sheet stack P has been conveyed onto the process tray 630, as shown in FIG. 13B, the front aligning plate 1002a and the rear aligning plate 1002b are each reciprocated by the alignment distance Ld so as to align the sheet stack P (center alignment). That is to say, the aligning plates 1002a and 1002b align the sheet stack loaded on the process tray 630 from the first standby positions corresponding to the front loading position. The aligned sheet stack is discharged onto the stack tray 700 by the discharge rollers 680a and 680b. The alignment by the aligning plates 1002a and 1002b is performed every time a sheet stack is discharged onto the process tray 630.

A similar alignment operation is performed in the case where a sheet stack is offset backward and aligned. In this case, as shown in FIG. 14, the center of offset is behind the center of the unit. That is to say, being offset by the lateral register correction unit 1001, the sheet stack is loaded at a rear loading position (second loading position) shown in FIG. 14. In FIG. 14, the positions of the aligning plates 1002a and 1002b shown by dashed lines are second standby positions.

Figure 14:
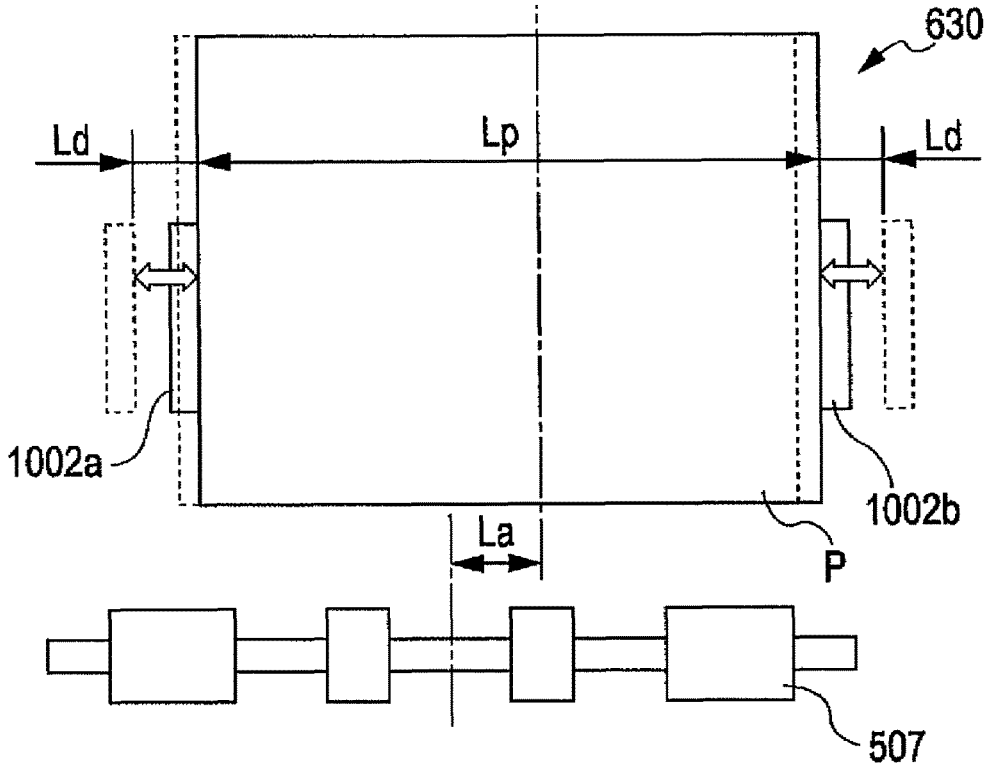
FIG. 14 also illustrates the alignment operation performed by the aligning members in the case where the lateral register correction is performed by the lateral register correction unit.

The rear (second) loading position shown in FIG. 14 is a predetermined offset distance away from the front (first) loading position shown in FIGS. 13A and 13B. When a sheet stack is loaded at the rear (second) loading position, the aligning plates 1002a and 1002b stand by at their respective second standby positions corresponding to the rear (second) loading position (FIG. 14).

The aligning plates 1002a and 1002b align the sheet stack loaded on the process tray 630 from the second standby positions corresponding to the rear (second) loading position. In this case, the alignment distance is the same as that in the case of forward offset shown in FIGS. 13A and 13B. Therefore, the description thereof will be omitted. The aligned sheet stack is discharged onto the stack tray 700 by the discharge rollers 680a and 680b.

When the shift sort mode is selected, first, a sheet stack is aligned at the front (first) loading position shown in FIGS. 13A and 13B and then discharged onto the stack tray 700. Next, another sheet stack is aligned at the rear (second) loading position shown in FIG. 14 and then discharged onto the stack tray 700. These operations are repeated alternately. In this way, a plurality of sheet stacks are loaded on the stack tray 700, being offset stack by stack. That is to say, a plurality of sheet stacks are loaded on the stack tray 700, being shifted in the width direction stack by stack.

In this embodiment, the front alignment motor M1202 and the rear alignment motor M1201 are stepping motors and self-activated. In the case of FIGS. 11A, 11B, and 12, the time T required for alignment operation per reciprocation can be expressed as $$T=2*2*La/V$$

where V is the driving velocity of the front alignment motor M1202 and the rear alignment motor M1201.

In the case of FIGS. 13A, 13B, and 14, the time T can be expressed as $$T=2*Ld/V$$

Since La>>Ld, performing the lateral register correction according to this embodiment can reduce the time by $$\Delta T=2*2*La/V-2*Ld/V$$

As described above, a sheet stack P is loaded on the process tray 630, being shifted to a predetermined offset position. Each sheet constituting the sheet stack is shifted by the lateral register correction unit 1001. The aligning plates 1002a and 1002b are moved to positions corresponding to the sheet offset position in advance.

According to the above-described embodiment, specifically, when a sheet stack is loaded at the front loading position on the process tray 630, the aligning plates 1002a and 1002b are moved to positions corresponding to the front loading position in advance. When a sheet stack is loaded at the rear loading position, the aligning plates 1002a and 1002b are moved to positions corresponding to the rear loading position in advance.

Since the distance between the aligning plates 1002a and 1002b is smaller than that in the case where the sheets are not shifted, the time of alignment operation can be reduced, and high productivity can be achieved.

When the lateral register correction is performed as in this embodiment, the alignment distance Ld is set slightly larger than the distance Le of the lateral register displacement that occurs in the conveying path from the lateral register correction unit 1001 to the process tray 630 in the finisher 500. Hitherto, the offset distance La has needed to be set larger than the sum of the distance Lb of the lateral register displacement in the photocopier body 10 and the distance Lc of the lateral register displacement in the finisher 500.

Since the minimum offset distance is reduced, the offset distance can be set more flexibly. Therefore, a more user-friendly and more productive finisher 500 and an image forming apparatus having the same can be provided.

In the case of small sized sheets, since the proportion of the offset distance in the sheet width is great, the sheet stacks stacked on the stack tray 700 collapse easily. Therefore, in the case of small sized sheets, the offset distance is set smaller than that in the case of large sized sheets.

Thus, a larger number of sheet stacks can be stacked in a well-aligned state. The maximum number of sheet stacks that can be loaded on the stack tray 700 is increased. In addition, the stacked sheet stacks do not collapse easily. As a result, a larger number of copies can be set for a job. In addition, system downtime due to collapse of sheet stacks is reduced. Therefore, the productivity can be further improved.

In the staple mode, when each sheet stack is stapled at one place, difference in height between the front and the rear of the stack of stapled sheet stacks tends to occur due to accumulated staples. In contrast, when each sheet stack is stapled at two places, difference in height between the front and the rear of the stack of stapled sheet stacks does not occur easily. Therefore, in the case of two-place stapling, the offset distance is set small. The two-place stapling is at a disadvantage in productivity by the time required to move the stapler. However, by setting the offset distance small, the productivity of the two-place stapling can be improved.

In this embodiment, if there is a malfunction in the lateral register correction unit 1001, the function of lateral register correction can be cut off. That is to say, there is a mode in which, if there is a malfunction in the lateral register correction unit 1001, the finisher 500 operates without activating the lateral register correction unit 1001. The mode in which the finisher 500 operates without activating the lateral register correction unit 1001 will hereinafter be referred to as "redundant mode."

Figure 15:
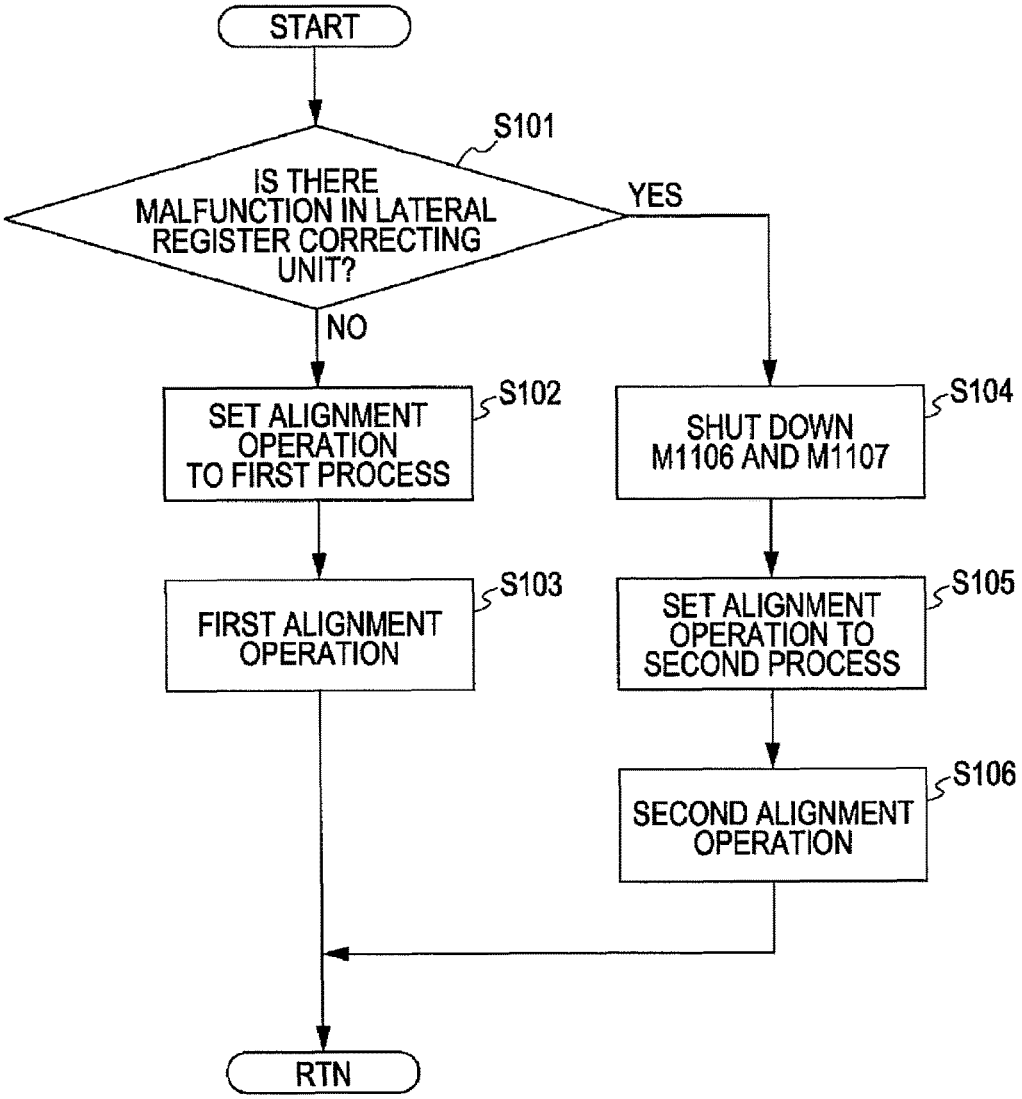
FIG. 15 is a flowchart illustrating the redundant mode in the finisher.

Next, the redundant mode will be described with reference to a flowchart shown in FIG. 15.

When the finisher 500 is powered on, the initial operation of the motors is performed for checking the operation of the loads. The CPU 550 outputs a drive signal of the lateral register correction unit shifting motor M1107 so as to move the lateral register correction unit 1001. The lateral register correction unit HP sensor 1109 functions as a malfunction detecting device. The CPU 550 then monitors whether there is a change in the signal of the lateral register correction unit HP sensor 1109 to detect a malfunction in the lateral register correction unit 1001 (S101).

If the lateral register correction unit 1001 can move, that is to say, if the lateral register correction unit 1001 is normal, there is a change in the signal of the lateral register correction unit HP sensor 1109. In this case, the CPU 550 determines that the lateral register correction unit 1001 is normal. If the CPU 550 determines that the lateral register correction unit 1001 is normal (in the case of "NO" in S101), the CPU 550 sets the alignment operation to a first process including the lateral register correction (S102). Next, a first alignment operation including the lateral register correction is performed (S103).

On the other hand, if there is no change in the signal of the lateral register correction unit HP sensor 1109, the CPU 550 determines that there is a malfunction in the lateral register correction unit 1001. In this case (in the case of "YES" in S101), the CPU 550 enters the redundant mode.

After entering the redundant mode, the CPU 550 shuts down the lateral register correction unit shifting motor M1107 and the lateral register sensor shifting motor M1106 (S104). Next, the CPU 550 sets the alignment operation to a second process in which the lateral register correction is not performed (S105).

Next, a second alignment operation that does not include the lateral register correction is performed (S106). The second alignment operation is the same as the operation in the case where the lateral register correction is not performed by the lateral register correction unit 1001 shown in FIGS. 11A, 11B, and 12.

As described above, if there is a malfunction in the lateral register correction unit 1001, the CPU 550 is switched to the redundant mode, in which the function of lateral register correction is cut off and normal operation is continued. Therefore, system downtime can be avoided. Therefore, high productivity can be achieved.

Second Embodiment

A second embodiment of the present invention will be described.

In this embodiment, sheet stacks are discharged without being offset. In the first embodiment, when the lateral register correction unit 1001 performs the lateral register correction, the lateral register sensor unit 1105 is moved from the home position to a standby position that is predetermined on the basis of the sheet size and the offset distance (see FIGS. 6A, 6B, 8A, and 8B). In contrast, in this embodiment, the lateral register sensor unit 1105 is moved from the home position to a standby position that is predetermined on the basis of the sheet size only.

Next, the alignment operation of a finisher that is a sheet processing apparatus according to this embodiment will be described. Before that, the alignment operation in the case where the lateral register correction is not performed by the lateral register correction unit 1001 will be described with reference to FIGS. 16A, 16B, and 17.

Figure 16A:
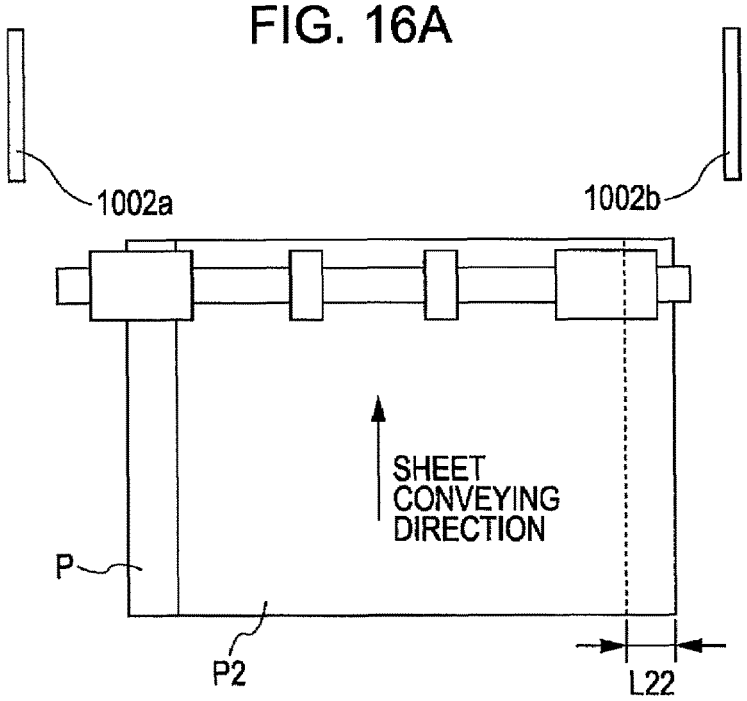
FIGS. 16A and 16B illustrate the alignment operation performed by aligning members provided in a sheet processing apparatus according to a second embodiment of the present invention in the case where the lateral register correction is not performed by the lateral register correction unit.

In this case, the front aligning plate 1002a and the rear aligning plate 1002b move from their respective initial positions shown in FIG. 16A to their respective standby positions and stand by there. These standby positions are determined taking into consideration the distance of lateral register displacement that occurs in the photocopier body 10 and the distance of lateral register displacement that occurs in the finisher 500. These standby positions are positions such that the alignment operation is possible even if a sheet stack P2 is displaced from the ideally corrected position by a maximum distance L22.

Figure 16B:
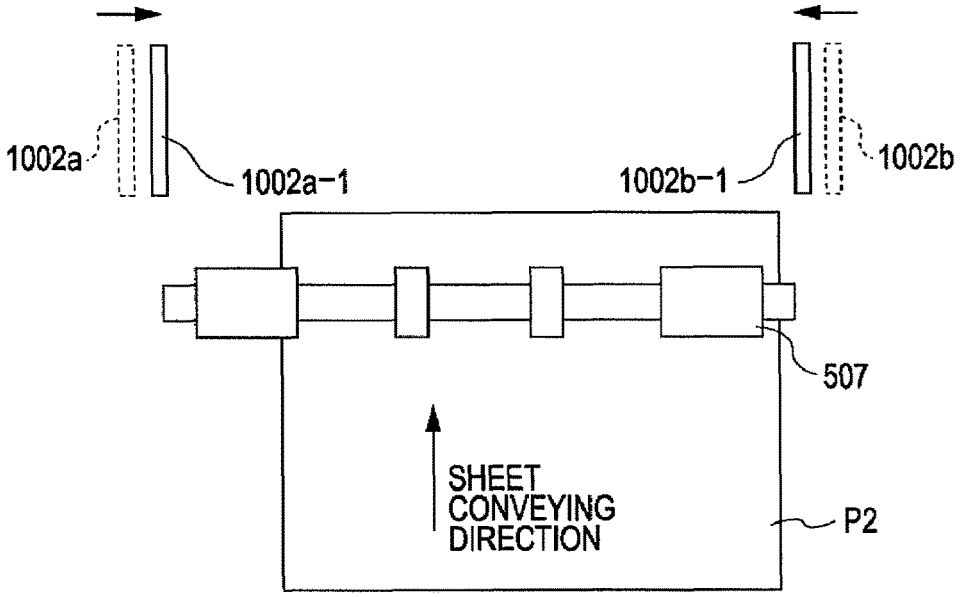
Figure 17:
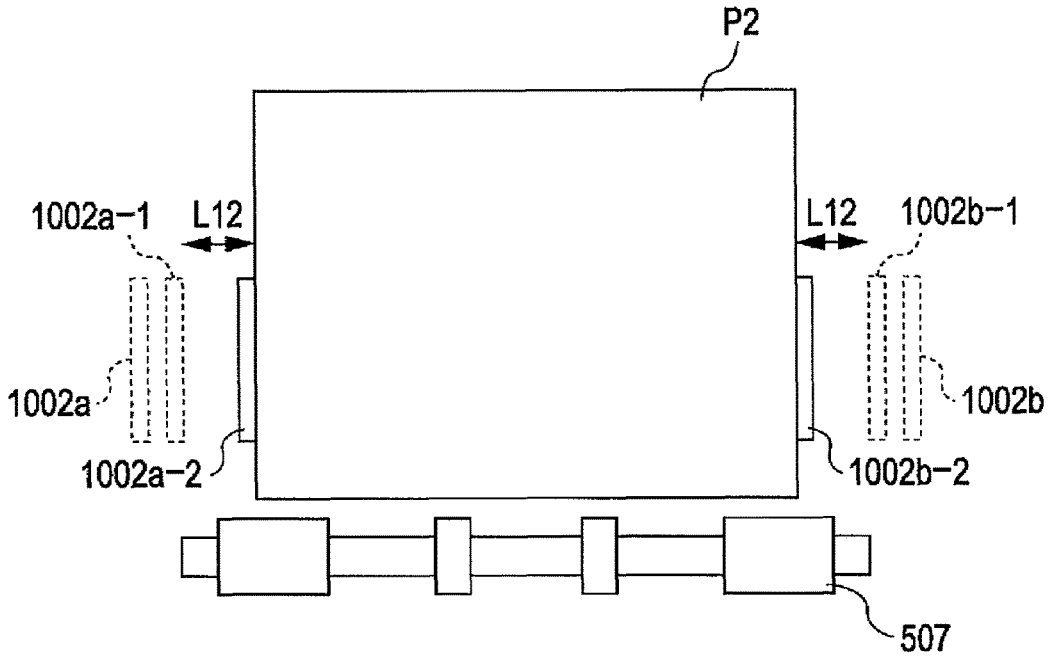
FIG. 17 also illustrates the alignment operation performed by the aligning members in the case where the lateral register correction is not performed by the lateral register correction unit.

Next, as shown in FIG. 16B, when the sheet stack P2 enters the process tray 630, the front aligning plate 1002a and the rear aligning plate 1002b move to their respective standby positions 1002a-1 and 1002b-1 according to the sheet size. After the sheet stack P2 is loaded on the process tray 630, as shown in FIG. 17, the front aligning plate 1002a and the rear aligning plate 1002b each reciprocate a distance L12 between the standby positions 1002a-1 and 1002b-1 and pressing positions 1002a-2 and 1002b-2 so as to align the sheet stack P2. This alignment is performed every time a sheet stack is loaded on the process tray 630.

Next, the alignment operation in the case where the lateral register correction is performed in the finisher 500 will be described with reference to FIGS. 18A, 18B, and 19.

Figure 18A:
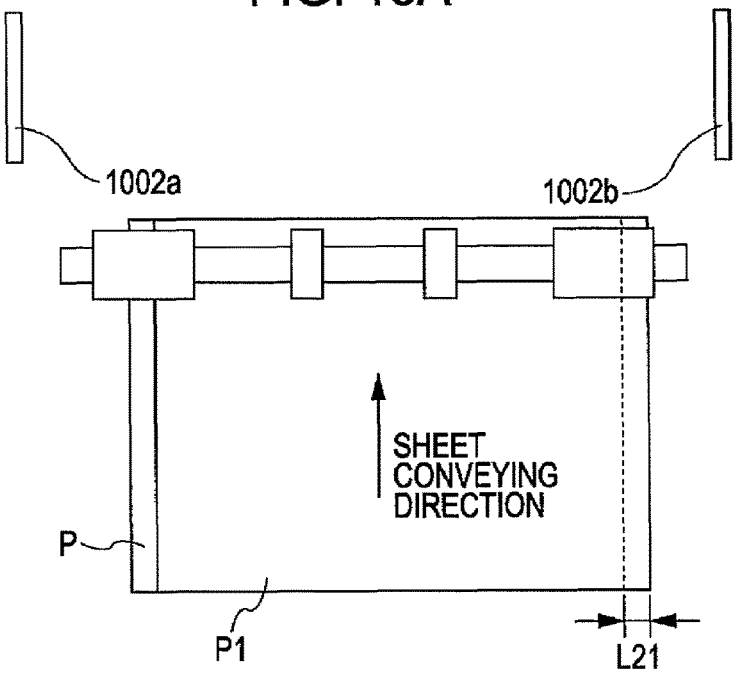
FIGS. 18A and 18B illustrate the alignment operation performed by the aligning members in the case where the lateral register correction is performed by the lateral register correction unit.

In this case, as shown in FIG. 18A, the lateral register displacement of a sheet stack P1 is corrected by the lateral register correction unit 1001 in the finisher 500. Therefore, it is only necessary to take into consideration the lateral register displacement that occurs in the sheet conveyance from the lateral register correction unit 1001 to the process tray 630. Therefore, the distance L21 of displacement of the sheet stack P1 to be taken into consideration, that is to say, the distance of displacement from the ideally corrected sheet stack P is smaller than the distance L22 shown in FIG. 16A.

Figure 18B:
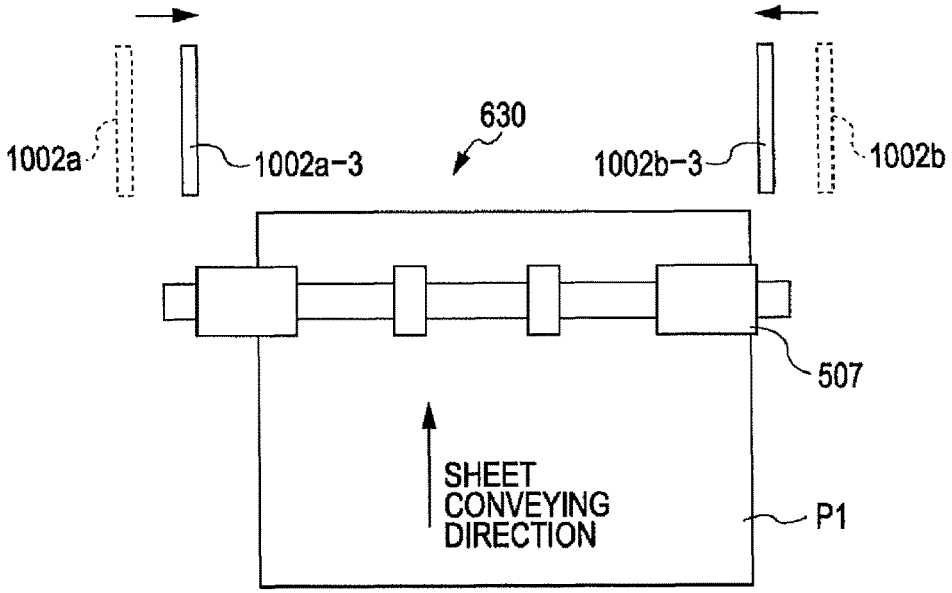

Next, as shown in FIG. 18B, when the sheet stack P1 enters the process tray 630, the front aligning plate 1002a and the rear aligning plate 1002b move to their respective standby positions 1002a-3 and 1002b-3 according to the sheet size.

Figure 19:
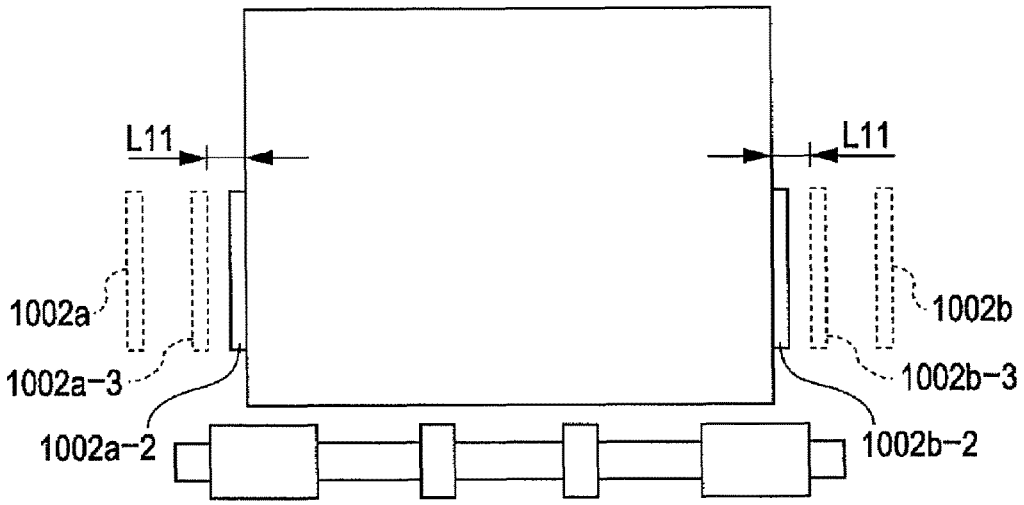
FIG. 19 also illustrates the alignment operation performed by the aligning members in the case where the lateral register correction is performed by the lateral register correction unit.

After the sheet stack P1 is loaded on the process tray 630, as shown in FIG. 19, the front aligning plate 1002a and the rear aligning plate 1002b each reciprocate a distance L11 between the standby positions 1002a-3 and 1002b-3 and pressing positions 1002a-2 and 1002b-2 so as to align the sheet stack P1. This alignment is performed every time a sheet stack is loaded on the process tray 630.

The distance L12 is set larger than the distance L11. That is to say, the distance between the front aligning plate 1002a and the rear aligning plate 1002b in the case where the lateral register correction unit 1001 shifts the sheets in the width direction so as to perform position correction in the width direction (the distance between the standby positions 1002a-3 and 1002b-3) is smaller than the distance between the front aligning plate 1002a and the rear aligning plate 1002b in the case where the lateral register correction unit 1001 does not shift the sheets (the distance between the standby positions 1002a-1 and 1002b-1). The reason that the standby positions of the front aligning plate 1002a and the rear aligning plate 1002b are set as above is that the distance of displacement to be taken in consideration in the process tray 630 in the case where the lateral register correction unit 1001 shifts the sheets in the width direction so as to perform position correction in the width direction is smaller than that in the case where the lateral register correction unit 1001 does not shift the sheets.

In this embodiment, the front alignment motor M1202 and the rear alignment motor M1201 are stepping motors and self-activated. In the case of FIGS. 16A, 16B, and 17, the time T required for alignment operation per reciprocation can be expressed as $$T=2*L12/V$$

where V is the driving velocity of the front alignment motor M1202 and the rear alignment motor M1201. In the case of FIGS. 18A, 18B, and 19, the time T can be expressed as $$T=2*L11/V$$

Since L12>L11, performing the lateral register correction according to this embodiment can reduce the time by $$\Delta T=2*L12/V-2*L11/V$$

Since the distance between the aligning plates 1002a and 1002b is smaller than that in the case where the sheets are not shifted, the time of alignment operation can be reduced, and high productivity can be achieved.

As in the first embodiment, the CPU 550 monitors whether there is a change in the signal of the lateral register correction unit HP sensor 1109 (malfunction detecting device). If the CPU 550 determines that there is a malfunction in the lateral register correction unit 1001, the lateral register correction unit 1001 does not perform the lateral register correction.

In both of the above embodiments, a plurality of sheets are wrapped around the buffer roller 505. The wrapped sheets are then together discharged onto the process tray 630. However, sheets that are shifted by a shift conveying unit may be discharged one by one onto the process tray 630 so as to form a stack.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An apparatus comprising:

a shift conveying unit that conveys a sheet in a sheet conveying direction and shifts the sheet in a width direction perpendicular to the sheet conveying direction;

a sheet tray on which sheets *shifted by the shift conveying unit* are loaded at a first loading position and a second loading position that is offset from the first loading position in the width direction; and an aligning member that aligns the sheet stacked on the sheet tray in the width direction, the aligning member is movable *between a first position corresponding to the first loading position and a second position corresponding to the second loading position* in the width direction, wherein the aligning member is moved [at a first position corresponding] to the first [loading] position *and thereafter aligns the sheets loaded on the sheet tray at the first loading position* in the case that *the* sheets are loaded at the first loading position, and wherein the aligning member is moved [at] *to* the second position [corresponding to] *and thereafter aligns the*

*sheets loaded on the sheet tray at* the second loading position in the case that *the* sheets [and aligned] are loaded at the second loading position.

2. An apparatus according to claim 1, further comprising a position detecting unit that detects a position of the sheet in the width direction, wherein the shift conveying unit shifts the sheet in the width direction according to the position of sheet detected by the [detecting sensor] *position detecting unit*.

3. An apparatus according to claim 2, wherein the position detecting unit detects an end edge parallel to the conveying direction of the sheet.

4. An apparatus according to claim 1, wherein a shift distance of the sheet by the shift conveying unit is set according to sheet size.

5. An apparatus according to claim 1, wherein the aligning member aligns sheets by moving from [a standby] *the first* position every time *the* sheets are loaded onto the sheet tray *in the case that the sheets are loaded at the first loading position, and the aligning member aligns the sheets by moving from the second position every time the sheets are loaded onto the sheet tray in the case that the sheets are loaded at the second loading position*.

*6. An apparatus according to claim 1, further comprising:*

*a discharging member that discharges the sheets aligned by the aligning member; and*

*a discharging tray on which sheets discharged by the discharge member are loaded.*

*7. An apparatus, comprising:*

*a shift conveying unit that conveys a sheet in a sheet conveying direction and shifts the sheet in a width direction perpendicular to the sheet conveying direction;*

*a sheet tray on which sheets shifted by the shift conveying unit are loaded at a first loading position and a second loading position that is offset from the first loading position in the width direction; and*

*an aligning member that aligns the sheet stacked on the sheet tray in the width direction, the aligning member is movable between a first position corresponding to the first loading position and a second position corresponding to the second loading position in the width direction,*

*wherein the aligning member aligns the sheet, loaded at the first loading position, at the first position in the case that the sheets are loaded at the first loading position, and*

*wherein the aligning member aligns the sheet, loaded at the second loading position, at the second position in the case that the sheets are loaded at the second loading position.*

*8. An apparatus according to claim 7, further comprising a position detecting unit that detects a position of the sheet in the width direction, wherein the shift conveying unit shifts the sheet in the width direction according to the position of sheet detected by the position detecting unit.*

*9. An apparatus according to claim 8, wherein the position detecting unit detects an end edge parallel to the conveying direction of the sheet.*

*10. An apparatus according to claim 7, wherein a shift distance of the sheet by the shift conveying unit is set according to sheet size.*

*11. An apparatus according to claim 7, wherein the aligning member aligns sheets by moving from the first position every time the sheets are loaded onto the sheet tray in the case that the sheets are loaded at the first loading position, and the aligning member aligns the sheets by moving from the second position every time the sheets are loaded onto the sheet tray in the case that the sheets are loaded at the second loading position.*

*12. An apparatus according to claim 7, further comprising:*

*a discharging member that discharges the sheets aligned by the aligning member; and*

*a discharging tray on which sheets discharged by the discharge member are loaded.*

* * * * *